US010245660B2

(12) United States Patent
Myrfield

(10) Patent No.: US 10,245,660 B2
(45) Date of Patent: Apr. 2, 2019

(54) SAW GUIDE PRESSURE FEED SPEED CONTROL SYSTEMS AND METHODS

(71) Applicant: Warren L Myrfield, Olympia, WA (US)

(72) Inventor: Warren L Myrfield, Olympia, WA (US)

(*) Notice: Subject to any disclaimer, the term of this patent is extended or adjusted under 35 U.S.C. 154(b) by 29 days.

(21) Appl. No.: 14/556,139

(22) Filed: Nov. 29, 2014

(65) Prior Publication Data
US 2015/0158097 A1 Jun. 11, 2015

Related U.S. Application Data

(60) Provisional application No. 62/062,941, filed on Oct. 12, 2014, provisional application No. 61/913,361, filed on Dec. 8, 2013.

(51) Int. Cl.
B23D 55/04 (2006.01)
B27B 31/06 (2006.01)
B27B 15/04 (2006.01)
B23D 55/08 (2006.01)
B23D 59/00 (2006.01)
B23Q 15/12 (2006.01)

(52) U.S. Cl.
CPC ......... *B23D 55/046* (2013.01); *B23D 55/084* (2013.01); *B23D 59/002* (2013.01); *B23Q 15/12* (2013.01); *B27B 15/04* (2013.01); *B27B 31/06* (2013.01); *G05B 2219/45144* (2013.01); *G05B 2219/49106* (2013.01); *Y02P 90/86* (2015.11); *Y10T 83/04* (2015.04); *Y10T 83/6475* (2015.04); *Y10T 83/7226* (2015.04); *Y10T 83/7264* (2015.04)

(58) Field of Classification Search
CPC .. B23D 55/046; B23D 55/084; B23D 59/002; B27B 15/04; B27B 31/06
See application file for complete search history.

(56) References Cited

U.S. PATENT DOCUMENTS

| 3,680,417 | A | | 8/1972 | Wells | |
| 3,715,946 | A | | 2/1973 | Kaltenbach | |
| 4,139,035 | A | | 2/1979 | Bystedt | |
| 4,765,213 | A | | 8/1988 | Kondo | |
| 4,901,612 | A | * | 2/1990 | Harris | B23D 53/08 83/56 |
| 4,926,917 | A | * | 5/1990 | Kirbach | B23D 55/046 144/356 |
| 5,694,821 | A | * | 12/1997 | Smith | B23D 59/002 700/188 |
| 6,382,062 | B1 | | 5/2002 | Smith | |

(Continued)

OTHER PUBLICATIONS

Myrfield, W, "Sensing Saw Guide Pressure to Control Feedspeed", Presentation to 25th Annual Wood Machining Workshop, Portland OR. Oct. 14, 2014 8 pages.

*Primary Examiner* — Kenneth E Peterson
*Assistant Examiner* — Liang Dong
(74) *Attorney, Agent, or Firm* — Mersenne Law

(57) ABSTRACT

A sawmill feedspeed control system having a force sensor operatively coupled to a sawguide of a sawblade, the output of the force sensor being processed and supplied to a motion controller and driver for reducing or increasing feed velocity of a workpiece so as to prevent overfeed or underfeed, while minimizing deviations of the blade from a straight cut and maximizing production throughput.

8 Claims, 18 Drawing Sheets

(56) References Cited

U.S. PATENT DOCUMENTS

| | | | |
|---|---|---|---|
| 6,467,352 B2 | 10/2002 | Schafer | |
| 6,681,672 B2 | 1/2004 | Myrfield | |
| 6,817,393 B2 * | 11/2004 | Quenneville | B27B 1/007 |
| | | | 144/3.1 |
| 2008/0302227 A1 * | 12/2008 | Viljanen | B23D 47/00 |
| | | | 83/820 |
| 2010/0024226 A1 * | 2/2010 | Kaiser | B23D 49/162 |
| | | | 30/392 |

* cited by examiner

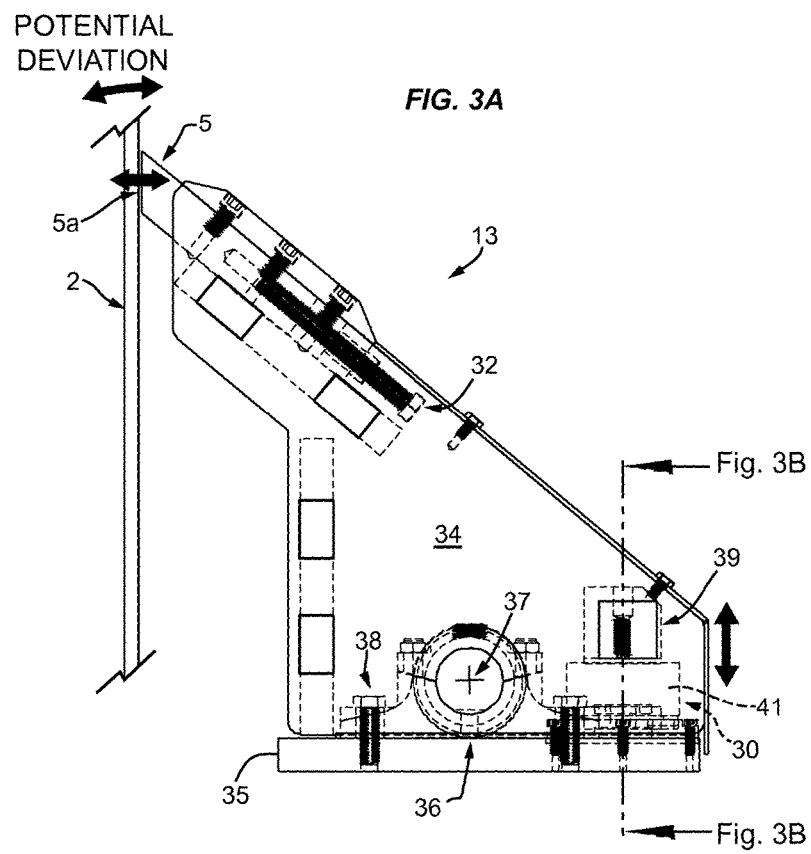
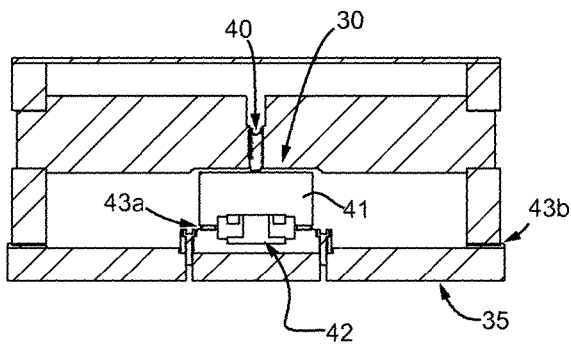
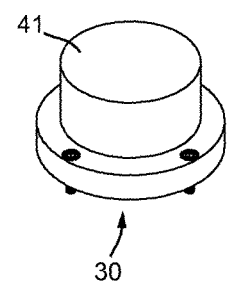

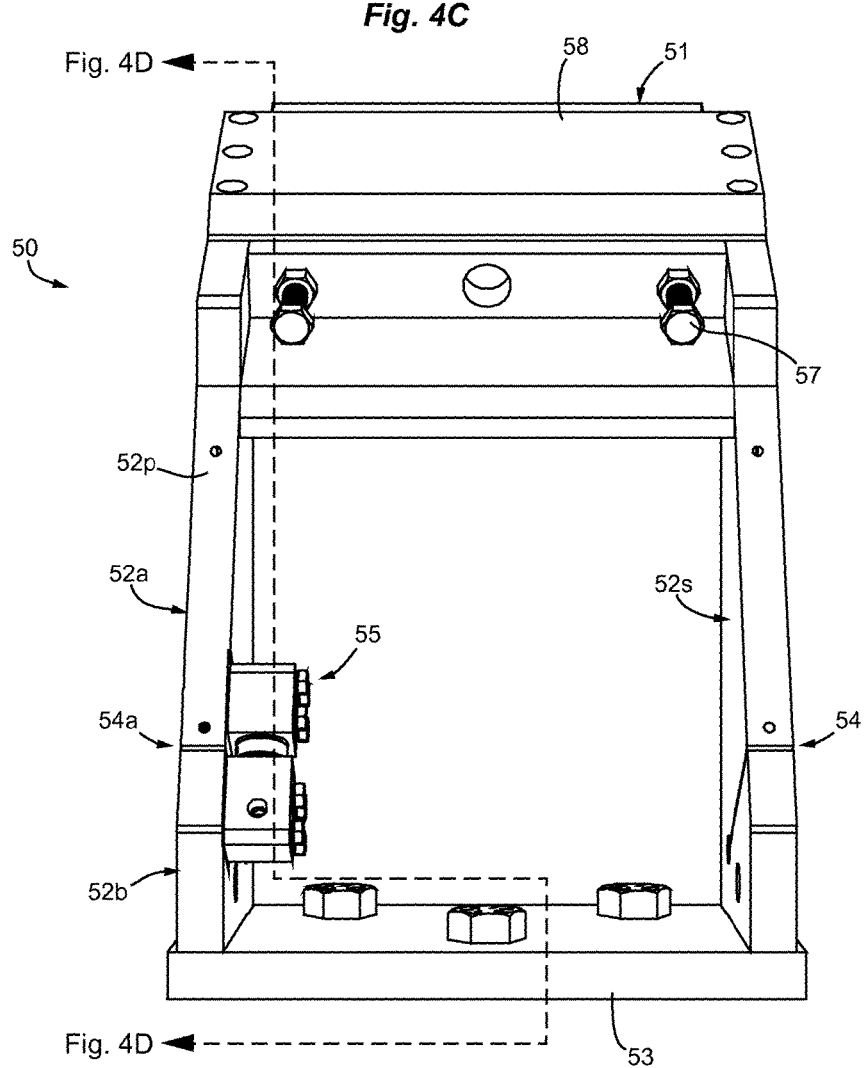

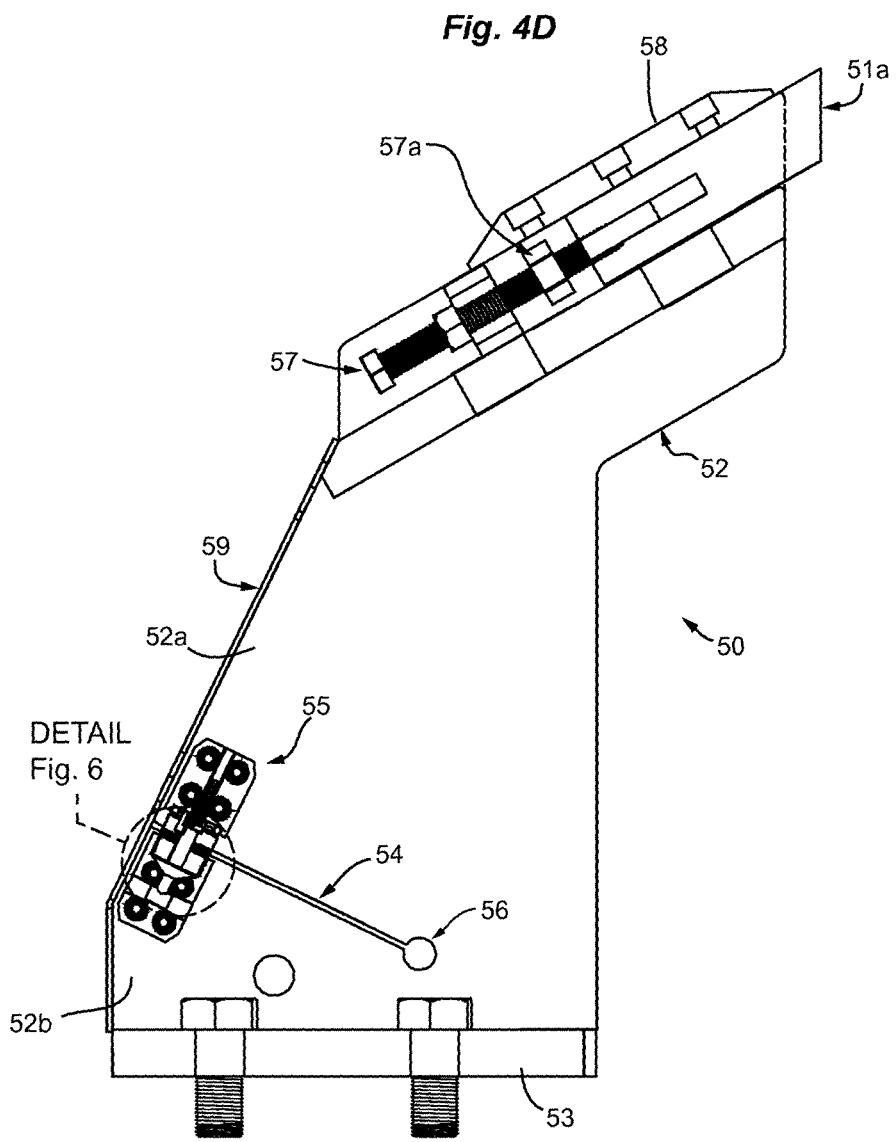

LOAD CELL ASSEMBLY DETAIL

SECTION A-A

SECTION B-B

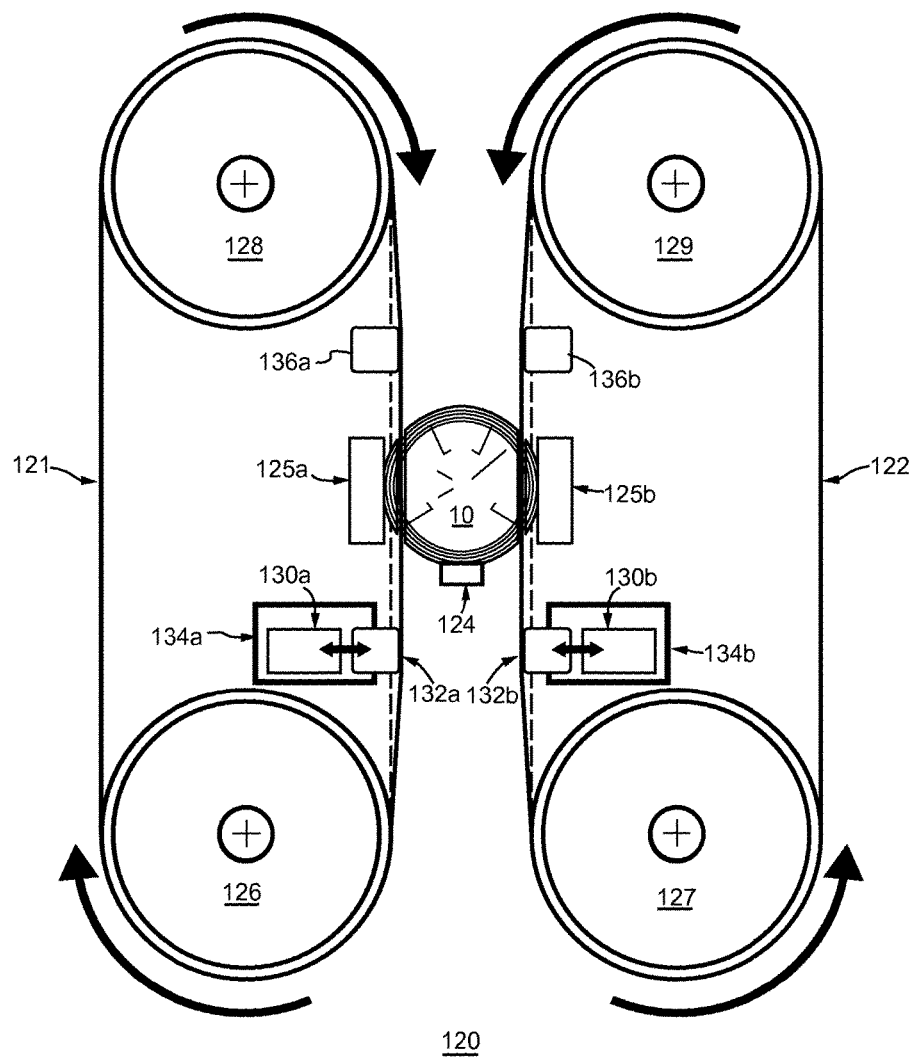

SAW GUIDE PRESSURE FEED SPEED CONTROL SYSTEMS AND METHODS

CROSS REFERENCE TO RELATED APPLICATIONS

This application claims priority to U.S. Provisional Patent Ser. No. 62/062,941, filed 12 Oct. 2014, and to U.S. Provisional Patent Ser. No. 61/913,361, filed 8 Dec. 2013, which are herein incorporated in full for all purposes.

FIELD OF THE INVENTION

This invention is related to systems and methods for use in operating anti-deviation control loops when sawing raw materials, particularly timber into lumber.

BACKGROUND

Log feed rate is a critical parameter in the economics of sawmill operation. The large bandsaws used by the lumber industry reduce logs to useable lumber sizes. Operators manipulate the velocity of the logs through the saw, but deviations in the cut due to grain, knots, saw wear, wetness, and mechanical drive-related problems decrease the throughput and useable product by requiring a slowdown of the feed rate. Even with the best currently available equipment, an oscillation of the sawblade in the cut, called "snaking", can develop due to excessive feed velocity.

Optimal performance will require feedspeed adjustments faster than an operator can respond, and currently available automated systems do not have feedback means to make timely adjustments in feedspeed. Typically feed velocities based on depth-of-cut are set conservatively to avoid overfeed. Only a few feed systems monitor power consumption of the saw motor for feedback. In these cases the sawblade must be entered into the cut conservatively and feed ramped up slowly while watching power consumption. Throughput must be conservative to avoid overfeed. Any speed adjustments due to "snaking" or "washboarding" can result in poorer tolerance control and production losses. Speed is strongly influenced by the conditions and overall dimensions of the log, which may vary from several feet in diameter at one end, to a fraction of that at the other. Some automatic feed systems compensate for this change in depth-of-cut by using a constant gullet fill curve to calculate a feed velocity profile along the log. The same log likely is denser at its base than at its crown end and the wood may be dryer at one end or the other, leading to blade deviation if overfed. The greater the diameter of the log at the base, the greater the depth-of-cut, and the slower the feed. Feedspeed may be increased as the blade cuts into the smaller diameter, less dense, opposite end of the log. Grain is also not uniform. The base of the log may have the grain of the wood and the sap rings angling out so that the sawblade cuts across alternating rings of varying densities of material, for example, and thus varies along the length of the log. Woods such as Douglas Fir are noted for twisted grain and knots. These factors can result in unequal forces on the swage tips, requiring slower feed velocity to avoid displacing the blade from a true cut, and resulting in uneven or angled product that must be corrected by reductive planing in order to have saleable lumber.

It would seem that automation would offer a means for speeding production throughput, but initial efforts to develop methods for controlling feedspeed by measuring bandmill power consumption failed because the inertial resistance to any change in RPM of the bandsaw wheels, which may be 6 ft in diameter, is too large for effective feedback control of drive power and lags the changes that occur (in milliseconds) during early deviation from a true cut. Thus power control loops have proven sluggish in response time and are unsatisfactory.

However, the advantages of controlling feedspeed have been recognized. A number of motion control systems have been proposed, including U.S. Pat. No. 4,926,917 to Kirbach, which discloses the use of two saw line light lines, one at the entrance end of a log and the other at the exit end on the opposite side of the log, to determine the thickness of the log. A microprocessor produces an electric signal for controlling the speed of feed of the log through the band saw. An electromagnetic proximity sensor is employed to measure lateral deviation of the sawblade as it enters the cut as an indication to an operator of dull saw teeth or other problem with the blade.

In U.S. Pat. No. 5,694,821 to Smith, the depth-of-cut measurement is similar to that disclosed in the patent discussed above, an electromagnetic proximity sensor detects lateral deviation of a band sawblade as it enters the cut, and the electric signal is processed to provide a corresponding electric drive motor signal to increase or decrease the speed of a log being moved through the band saw. Because the blade deflection is monitored at the entry to the cut in these systems, feedback control is limited and delayed.

U.S. Pat. No. 6,681,672 to Myrfield has met with commercial success, and is co-owned by the inventor. The feed control system uses a laser line to allow video scanning of the diameter profile of a log on the carriage so as to measure the impending depth-of-cut by the band sawblade. A second laser line is arranged light with a reference point on the band sawblade for detecting the lateral deviation of the blade from its true cut path. A video camera with image analysis software for mapping log coordinates and speed is arranged to cover the diameter of a log on the carriage and to view the laser line projections. Output from the imaging system is fed into an algorithm to control the speed of the power drive motor of the carriage. Optical means have also been commercialized by SiCam Systems (Delta, British Columbia, Calif.), for lumber quality control, offering an electromagnetic proximity sensor to detect lateral deviation at the upper sawguide. Because any blade deflection is monitored at the entry into the cut, any capacity to provide feedback control would be limited and delayed; likely resulting in snaking.

However, the bandsaw control systems of the above disclosures are designed to measure displacement of the sawblade proximate to the point where a tooth enters the cut. But any displacement of the saw blade at the top of the cut is preceded by a change in lateral force at the bottom of the cut and displacement of the blade inherently cannot occur until the tooth has sawn through the cut. Therefore, displacement measurements made above the cut are "trailing" or "lagging" measurements. Lagging signals are inadequate for closed loop control of velocity, particularly at higher feedspeed where incipient deviation occurs in microseconds. Thus, there is a need in the art for a bandsaw feed rate controller with a sawguide force sensor that overcomes the above disadvantages.

SUMMARY

This invention relates to bandsaws and more particularly to methods and apparatus for controlling the speed of a workpiece being fed to a saw by measuring force associated with an incipient lateral deflection of the sawblade on a sawguide disposed between the cut and the drive wheel. Any conventional motion controller configured to drive workpiece feed may be used with the anti-deviation control systems of the invention.

In use, a sawguide is contacted on a first face of the moving blade near its exit from the cut and any change in sawguide pressure is instantaneously detected by a force sensor operatively coupled to the sawguide. Advantageously, because the guide is pre-strained (i.e., the blade is pre-stressed on the guide), the force sensor will reliably detect both positive and negative deviations of the blade from a true cut, essentially in real time and with microvolt resolution. Then using a computing machine and algorithms for motion control, a feedspeed adjustment or correction can be implemented that avoids greater blade deflection and returns the cut to a straight line. The forward motion of the log may be restored to an optimal speed as soon as the incipient deviation is corrected.

Advantageously, a change in tension detected by a force sensor at the bottom guide (between the cut exit and the drive wheel) precedes a blade deflection event, resulting in a faster and more precise correction with minimal overcompensation. This translates into a direct economic value in productivity and also in quality of the resultant timber.

In one aspect, the invention relates to a feedspeed controller for band saws having a load cell mounted on the sawguide between the cut and the drive wheel. The load cell outputs an electrical signal to an anti-deviation controller, which operates essentially instantaneously and with high precision, even in the often dusty atmosphere of a sawmill, correcting deviations and optimizing throughput by controlling workpiece motion. In this aspect, the invention is essentially a feedback process control loop that avoids overfeeding (and underfeeding) of logs. The controller executes process instructions based on load cell output so as to allow higher initial feed velocities and takes into account gullet fill and varying cutting depth from end to end of a log so as to increase feed throughput.

In another aspect, the invention relates to an apparatus for sensing blade deviation and cut resistance by monitoring sawguide pressure through use of one or more load cells incorporated into a guide holder and coupled to a sawguide that contacts the sawblade between the cut and the drive wheel. The feedback from sawguide pressure is input to a feedspeed control loop. The guide pressure control loop reacts much faster than a bandmill power loop can (because of the flywheel effect) and consequently prevents overfeed and underfeed that waste product and limit throughput. This results in higher initial velocity, less slowdown, and quicker return to depth-of-cut speed control (because there is essentially no reduction in bandmill wheel speed). The guide pressure is independent of the wheel inertia and is a direct measurement of the tension in the bandsaw. The guide pressure feedback has also been shown here to be a good measurement of deviation forces. Reducing speed to keep the sawguide pressure within plus and minus limits (with the initial static strain pressure as the "zero") has reduced the amount of deviation or snake and achieved higher feed throughput and better quality lumber in sawmill use.

One skilled in the art will recognize that the power limit of the bandmill motor and the gullet fill curve (as a function of depth-of-cut) are also factors in bandsaw throughput, and from these teachings can deduce that a power limit setpoint and a feedspeed may be established such that an increase in guide pressure will be indicative of an overpower or overfeed condition and, as such, is a more instantaneous indicator than a constant speed regulator or a torque-limiting regulator on the bandmill motor—simply because of the inertial dampening of the drive wheel mass. Similarly, gullet fill as calculated from a depth-of-cut model is not as sensitive or accurate as direct measurement of lateral force, which is often caused by wood spilling out of the gullet and into the cut when overfeed develops. Thus the force sensor of the invention is also useful in maintaining an upper limit on power and feedspeed and advantageously may be used to improve cut tolerances and throughput. When used in conjunction with gullet fill models known in the industry, throughput can be maximized to approach but not exceed conditions where deviation from a true cut develops.

The cutting step is generally controlled automatically by a computing machine having a processor and programmable instructions in memory, including algorithms to convert a force sensor signal and at least one feed position coordinate into changes in feedspeed, and for outputting any feedspeed adjustments to a motion controller.

In more specificity, the invention is a system for detecting a deviation of a cut from a true cut line by directly sensing a deviation force on a sawblade as it exits a cut in a workpiece. A bandmill incorporating the principles of the invention may include a) a bottom sawguide, the bottom sawguide having a front face for contacting and pre-straining the bandsaw sawblade; and b) a force sensor operatively coupled to a second face of the sawguide, such that the force sensor is enabled to sense a force associated with an incipient lateral deflection of the sawblade against or away from the sawguide and to output an electrical signal indicative of a magnitude and a direction of the deflection. The apparatus includes an anti-deviation control system configured to i) receive the electrical signal from the force sensor, ii) calculate a magnitude and a direction of the lateral deflection, and iii) output a corrective feedspeed adjustment. The feedspeed adjustment is fed to a motion controller system configured to operate a motion driver or drivers that engage and direct motion of the workpiece relative to the bandsaw sawblade. The motion drivers may include conventional workpiece drivers such as for moving a log through a bandmill, for example.

The apparatus may also include a mechanical linkage for operatively coupling the second face of the sawguide to the force sensor. Components of the mechanical linkage may include a sawguide housing assembly for mounting the sawguide on a bandmill. The sawguide housing assembly may include a sawguide support member, a framing member, and a force sensor support member. The force sensor support member may be a load cell assembly.

In a preferred embodiment, the sawguide support member is provided with adjustment bolts by which the sawguide is adjustably positioned so as to pre-strain the front face of the sawguide against the sawblade, thereby pre-stressing the sawblade, and the framing member has an upper aspect joined to the sawguide support member, a bottom aspect joined to a "base", an "anterior aspect" or face, and a "posterior aspect" or face ("anterior" and "posterior" aspects are taken with reference to the "front" defined by the front face of the saw guide), where the base of the framing member includes attachment means to the bandmill, and a supporting bracket, load cell, or other mount for the force sensor such that a strain on the sawguide is readily coupled to a strain on the force sensor through the mechanical linkage. The posterior face may be defined by one or more reinforcing or bracing members disposed on the frame, generally on a posteriolateral aspect thereof (i.e., a shoulder or edge member forming a "sidewall" of the frame that extends anterioposteriorally from the front face of the sawguide).

Advantageously, any strain experienced by the framing member may be focused on the force sensor. A slot or "cut" is intermediately disposed between the upper aspect and the bottom aspect of the framing member and extends part way (i.e., extending a part of the way) from a "mouth" defined posteriolaterally on the frame (or on a reinforcing member thereof) in a generally forward direction through the reinforcing member (or through a sidewall of the framing member). The slot terminates before completely bisecting the frame. The slot pre-disposes the framing member to "flex" at the mouth of the slot, the slot having a geometry and an aspect ratio configured such that a strain on the sawguide is concentrated or "magnified" at the mouth of the slot. This slot is herein termed the "strain concentration slot" and is an advance in the art of sawblade anti-deviation control. Pictorial representations of representative strain concentration slots (54, 174) and mouth elements (54*a*, 174*a*) of the invention are provided in the drawings.

Where a load cell is used, the cell is mounted so as to receive strain from the sawguide. In a preferred embodiment, the load cell assembly includes a first end member rigidly attached at one end on a first side of said slot proximate to the mouth of the strain concentration slot and a second end member rigidly attached at an opposite end on an opposite side of the slot near the mouth, the load cell assembly further comprising a slot-straddling member disposed between the end members and a force sensor package disposed between the slot-straddling member and a lateral aspect of one of the end members, such that the slot-straddling member is enabled to transfer any elastic compression or relaxation of said strain concentration slot to the force sensor.

Any elastic compression or relaxation of the slot is communicated through the slot-straddling member to the force sensor, which senses the flexural deformation, and generates an electrical signal that indicates a magnitude and a direction of any incipient blade deviation or change in resistance in the cut.

Thus the strain concentration slot in cooperation with the load cell assembly and force sensor enables:

a) a zero set state in which the force sensor is elastically pre-strained in compression by statically pre-stressing the sawguide against the sawblade and digitally zeroing the electrical signal; and, b) a deviation detection state wherein the force sensor is elastically compressed or relaxed through said linkage by any lateral deflection of said blade against or away from said sawguide during a cut and said electrical signal may range around zero from a positive value to a negative value. In short, the anti-deviation control system is configured to have a zero output between saw cuts and a dynamic positive or negative output during saw cuts. The dynamic output permits the magnitude and direction of any lateral deflection (either into or away from a sawguide) to be detected. Feedspeed adjustment instructions to the motion drivers correct any sawblade deflection and return the cut to a true cut line. Generally this process is almost instantaneous and occurs at the onset of a blade deviation, thus the terms used here, "incipient deviation" or "incipient deflection".

More broadly, the invention is an apparatus for controlling feedspeed of a bandsaw cut through a workpiece, and includes:

a) a bottom sawguide, the bottom sawguide having a front face and a second face disposed thereon, wherein the front face is enabled to contact and pre-strain a sawblade for making a cut through a workpiece;

b) a force sensor operatively coupled to the second face of the bottom sawguide, wherein the force sensor is enabled to sense a force associated with an incipient lateral deflection of a pre-strained sawblade toward or away from the front face during a cut and to output in real time an electrical signal indicative of a magnitude and a direction of the incipient lateral deflection from a true cut line;

c) an anti-deviation control system configured to receive the electrical signal from the force sensor and to calculate a magnitude and a direction in real time of the incipient lateral deflection from a true cut line, and further to calculate a corrective feedspeed adjustment output therefrom; and, d) a motion controller system operatively coupled to a motion drive mechanism, wherein the motion controller is enabled to receive the feedspeed adjustment output from the anti-deviation control system and control a workpiece feedspeed in response thereto.

In preferred embodiments, the bottom sawguide is operatively coupled to the force sensor by a linkage, the linkage may be a mechanical linkage, a hydraulic linkage, an electromagnetic linkage, or a combination thereof. Coupling results in transduction of any loads on the sawguide to compression or relaxation forces on the force sensor, with a resultant and corresponding electrical signal. The linkage is directly or indirectly mounted to a rigid supporting member of the bandmill and supports the sawguide and the force sensor.

In this configuration, the force sensor package may have two states: a) a zero set state wherein the force sensor is elastically pre-strained in compression by statically pre-stressing the sawguide against the sawblade through the linkage and digitally zeroing the electrical signal; and, b) a deviation detection state wherein the force sensor is elastically compressed or relaxed through said linkage by any lateral deflection of said blade against or away from said sawguide during a cut and said electrical signal may range from a positive value to a negative value. The anti-deviation control system receives the electrical signal from the force sensor and calculates a magnitude and a direction of a force on the blade, and further calculates a corrective feedspeed adjustment output to counter the deviation of the blade. Generally as workpiece feedspeed is slowed, the blade will return to a true cut. But it is preferable to feed the workpiece as fast as possible and reaction time is a factor, so the anti-deviation sensor and system of the invention may include feedback control loops for minimizing uneven cuts while maximizing workpiece throughput. Thus in one aspect, the apparatus and methods of the invention are embodied by incorporation of the force sensor, anti-deviation control subsystem, and motion controller subsystem with motion drivers into a negative feedback control loop enabled to reduce workpiece feedspeed to counter, reduce, or oppose an overfeed condition. In a complementary aspect, the apparatus and methods of the invention are embodied by incorporation of the force sensor, anti-deviation control subsystem, and motion controller subsystem with motion drivers into a positive feedback control loop enabled to maximize workpiece feedspeed while minimizing deviation from a true cut. Optionally, a combination of negative and positive feedback control may be used, or anti-deviation feedback control may be combined with other methods of feedspeed control, such as depth-of-cut, gullet fill, or log modeling control. Further, where the force sensor output is increased by resistance in the cut, such as due to dry or frozen wood, knots, twisted grain and the like, the negative feedback control loop may limit feedspeed to prevent blade deflection associated with increases in the bandmill motor power requirement (to overcome the increased resistance) above a setpoint. The power draw of a constant RPM motor will vary with the resistance in the cut, and the motor may be damaged if power is excessive. A power control loop controlling the bandsaw rotation velocity may also be used with the feedback control loop of the invention, and may be configured to act in cooperation with the anti-deviation control loop to limit power the sawblade if needed. Thus power limits may be coordinately controlled by reducing feedspeed.

The invention also includes methods for cutting a workpiece with a bandmill, the bandmill having a sawblade, a top sawguide and a bottom sawguide, each sawguide having a front face enabled to contact and pre-stress the sawblade during a cut through a workpiece, a motion controller and a drive mechanism for controlling workpiece feedspeed, where the method is characterized by: (a) providing an anti-deviation feedback loop controller to an operator of a bandmill, the anti-deviation feedback loop controller comprising: i) a force sensor operatively coupled to a second face of the bottom sawguide (wherein the force sensor is enabled to sense a force associated with an incipient lateral deflection of the pre-stressed sawblade against or away from the front face of the bottom sawguide during a cut and to output an electrical signal indicative of a magnitude and a direction of the incipient lateral deflection from a true cut line), ii) an anti-deviation control system configured to receive the electrical signal from the force sensor, to calculate a magnitude and a direction in real time a force on the blade, and to calculate a feedspeed adjustment output therefrom, and, iii) a motion controller system enabled to receive the feedspeed adjustment output from the anti-deviation control system and control a workpiece feedspeed in response thereto (wherein the motion controller system is operatively connected to the motion drive mechanism); (b) pre-stressing the sawblade by laterally straining the bottom sawguide against the sawblade; and, (c) while cutting a workpiece, monitoring the electrical signal from the force sensor and operating the motion drive mechanism under control of the anti-deviation control system so as to counter any lateral deflection of the sawblade from a true cut line, thereby operating an anti-deviation feedback control loop.

The step for pre-stressing a bandsaw sawblade has two components: a) applying a larger tensioning push on a center axle of an idler wheel and a center axle of a drive wheel of the bandmill (the idler wheel and drive wheel having the bandsaw sawblade looped thereacross) and b) then applying a smaller lateral push on the top sawguide and the bottom sawguide against the sawblade so as to displace the sawblade paralleledly out of plumb with a tangent line connecting the outside edges of the wheels, thereby generating a static electrical signal from the force sensor even when the sawblade is at rest.

The anti-deviation control system is further configured to digitally zero the electrical signal between cuts, such that a positive value of the electrical signal during a cut is associated with a lateral deflection of the sawblade in a first direction and a negative value is associated with a lateral deflection of the sawblade in an opposite direction.

Thus the method involves detection of the deflections of the sawblade dynamically in real time by operating the force sensor in two process states: a) a "zero set state" wherein the force sensor is elastically pre-strained in compression by statically pre-stressing the sawguide against the sawblade, followed by zeroing the electrical signal that results in supporting circuitry; and b) a "deviation detection state" wherein force sensor is elastically compressed or relaxed during a cut by any lateral deflection of the sawblade against or away from the sawguide such that the electrical signal may range around zero from a positive value to a negative value.

The force sensor may be a strain gauge, and in a preferred embodiment the circuit is configured to perform a strain gauge input zeroing function between cuts. Cuts may be end-to-end cuts, rip cuts, or crosscuts, for example.

More generally, any force sensor may be used. Load cells illustrate the operation of a feedback control system with a sensor directed at forces measured as the saw tooth exits the workpiece but are not limiting in the operation of the invention. In other embodiments, the force sensors are the same as those employed in accelerometers relying on solid state MEMS construction and having no moving parts. With force sensors of this type, the displacement resulting in a correction can be infinitesimally small and fast.

As an unexpected advantage, by storing a history of force sensor data for a series of cuts, very accurate projections of sawblade life may be calculated, allowing the operator to plan for and optimize periodic changeouts of any worn or damaged sawblade or re-facing of the guideblocks as required to maintain productivity and avoid unexpected shutdowns.

These and other elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the inventive art disclosed here are more readily understood by considering the drawings, in which:

FIGS. 3A, 3B and 3C are see-through views of a first embodiment of a sawguide and guide holder and load cell assembly detail.

FIGS. 4A, 4B, and 4C are perspective views of an improved embodiment of the sawguide and guide holder with load cell for controlling saw deviation. FIG. 4D is a schematic view of internal structures in the guide holder.

FIG. 8 is a schematic representation of a twin bandmill having two sawblades operating side by side, each bandmill having guide pressure sensing, with single feedspeed controller. Feedspeed is controlled by the highest pressure deviation of either of the two blades.

Figure 1:
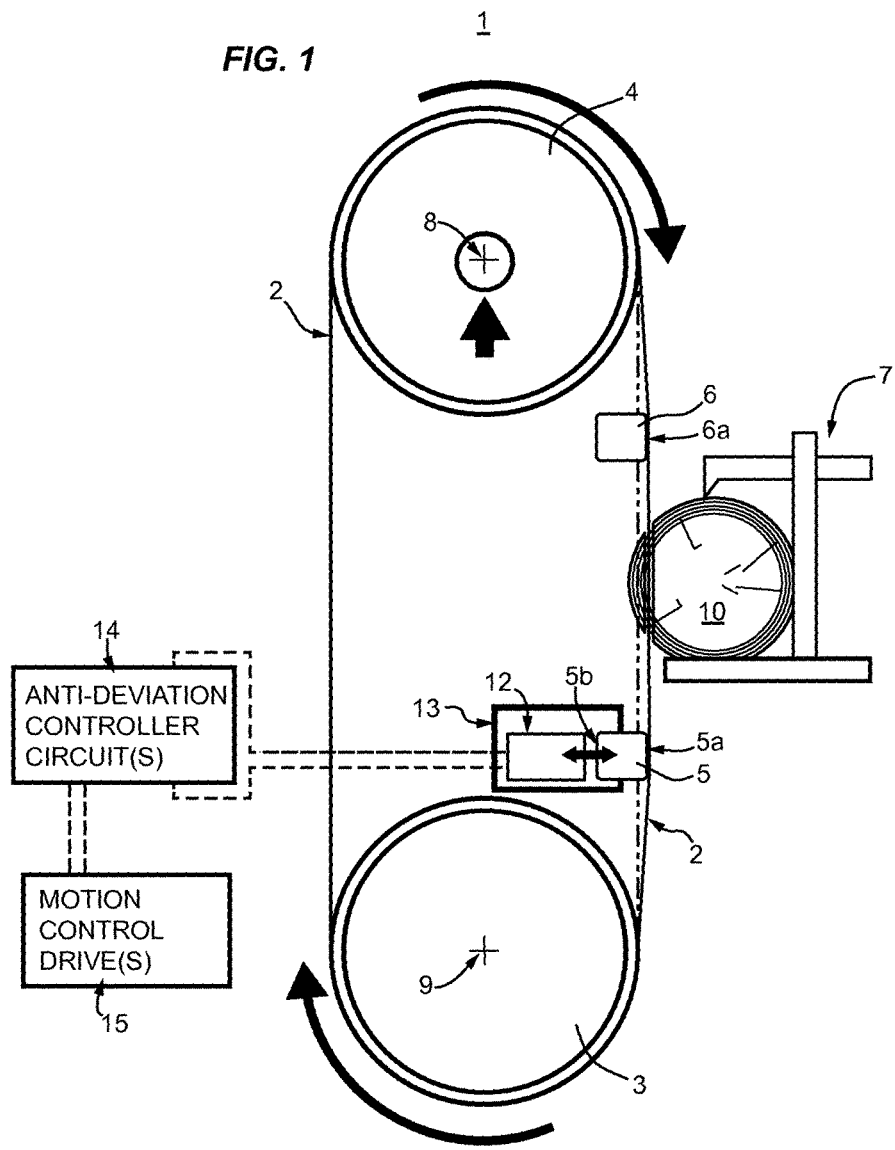
FIG. 1 is a schematic view of a bandmill having a sawblade, two wheels and two sawguides. Also shown is a workpiece.

The drawing figures are not necessarily to scale. Direction of motion and mechanical coupling of forces may be shown by bold arrows without further explanation where the meaning would be obvious to one skilled in the arts. Certain features or components herein may be shown in somewhat schematic form and some details of conventional elements may not be shown in the interest of clarity, explanation, and conciseness. The drawing figures are hereby made part of the specification, written description and teachings disclosed herein.

Glossary and Notation

Certain terms are used throughout the following description to refer to particular features, steps or components, and are used as terms of disclosure and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

"Deviation" or "deflection" refers to a change in the cut line from a true cut, and may be a deflection where the blade turns from a true cut line on the X-Y plane (typically a ground plane), or may be an angular deflection where the saw cut becomes out of plumb, tilting in a Z-dimension relative to the X-Y plane.

"Deviation force" or "deflection force" relates to lateral forces on a sawblade (against or away from a sawguide front face). "Displacement force" relates to pre-straining of a sawblade on a sawguide. Sawguide "pressure" is used here to indicate a force coupled to a force sensor through a sawguide (also termed a "guide block)" and most commonly will vary with a deviation force exerted through the sawguide onto a force sensor sensu lato.

"Feedspeed" generally refers to the linear velocity of the workpiece relative to the fixed position of the sawblade or blades. Various motion drivers are known in the art. Devices for feeding a workpiece through a bandmill may include an X-Y-Z controller and may involve multiple arms, rollers, a sharp chain, a reciprocating carriage, and the like as known in the art. Feedspeed may also refer to the velocity of a sawblade moving through a fixed workpiece.

"Underfeed" is defined by a condition in which the cut speed is sub-optimal and throughput is slower than possible, either due to an excess of caution (e.g., with conservative "speed to depth-of-cut" velocity control) or to operator over-correction in manually controlled systems.

"Overfeed" is a condition in which the log is moving relative to the bandsaw at a velocity that causes the cut to deviate from a straight path, or for the bandmill power consumption to exceed the limit of its drive motor. In this condition, the gullet fill limit is exceeded and saw power consumption may exceed drive motor limits. In extreme overfeeding the bandsaw can be pushed off the wheel or deviate far enough to contact the drive mechanism and break—a very unsafe condition. For optimal operation, feedspeed may be increased until a limit is reached when a deviation becomes "incipient" and the speed is thus bordering on an overfeed condition.

The "gullet fill", relates to the packing of wood chips and sawdust into the gullet between each tooth of the sawblade during a cut. Gullet overfill may lead to saw deviation. With a constant sawblade speed, the gullet fill is proportional to the depth-of-cut multiplied by the feedspeed. An ideal gullet fill will change with wood species, dryness, saw shape and saw condition, all of which affect the way the wood chips pack into the gullet.

General connection terms including, but not limited to "connected," "attached," "linked," "coupled," "conjoined," "secured," "mounted", and "affixed" are not meant to be limiting, such that structures so "associated" may have more than one way of being associated. "Digitally connected" indicates a connection for conveying a digital signal therethrough; "electrically connected" indicates a connection for conveying or sensing a current or a voltage therethrough; "electromagnetically connected" indicates a connection or linkage for conveying or sensing a Coulombic or Lorentz force therethrough; "hydraulically connected" indicates a connection or linkage for conveying or sensing a pressure force therethrough; "mechanically connected" indicates a connection, mechanical stack, or linkage for conveying or sensing a force therethrough, and so forth.

Relative terms should be construed as such. For example, the term "front" is meant to be relative to the term "back," the term "upper" is meant to be relative to the term "lower," the term "anterior" is meant to be relative to the term "posterior," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments. "Conventional" delineates subject matter, including any technology or method, which is known and commonly understood in the technology to which this invention relates.

It should be noted that the terms "may," "can," and "might" are used to indicate alternatives and optional features and only should be construed as a limitation when specifically included in the claims of a patent as issued. The various components, features, steps, or embodiments thereof are all "preferred" whether or not it is specifically indicated. Claims not including a specific limitation should not be construed to include that limitation. Specifically, the term "a" or "an" as used in the claims does not exclude a plurality.

Unless the context requires otherwise, throughout the specification and claims that follow, the term "comprise" and variations thereof, such as, "comprises" and "comprising" are to be construed in an open, inclusive sense—that is in the sense of "including, but not limited to." For example, a device comprising a "member" may in fact include a plurality of said "members" without departing from the claimed invention.

The appended claims are not to be interpreted as including means-plus-function limitations, unless such a limitation is explicitly recited in a given claim using the phrase "means for."

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

"Computer" means a virtual or physical computing machine or systems that accepts information in digital or similar form and manipulates it for a specific result based on a sequence of instructions. Such instructions may include an algorithm or multiple algorithms each having distinct outputs. "Computing machine" is used in a broad sense, and may include logic circuitry having a processor, programmable memory or firmware, random access memory, and generally one or more ports to I/O devices such as a graphical user interface, a pointer, a keypad, a sensor, imaging circuitry, a radio or wired communications link, and so forth. One or more processors may be integrated into the display, sensor and communications modules of an apparatus of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. The comprehensive term "computing machine" includes individual computers or servers operating independently and individual computers or servers formed into networks.

A "server" refers to a software engine or a computing machine on which a software engine runs, and provides a service or services to a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an "architecture" of a computing system that can be co-localized on a single computing machine or can be distributed throughout a network.

"Processor" refers to a digital device that accepts information in digital form and manipulates it for a specific result based on a sequence of programmed instructions. Processors are used as parts of digital circuits that generally include a clock, random access memory and non-volatile memory (containing programming instructions), and may interface with other digital devices or with analog devices through I/O ports, for example an A/D converter, as known to those skilled in the art.

DETAILED DESCRIPTION

Referring to FIG. 1, a schematic view of a bandmill (1) is presented. The sawblade (2) rotates around a drive wheel (3) and an idler wheel (4) and is powered by a motor drive (not shown). Two sawguides or guideblocks (5, 6) contact the sawblade, one on top of the workpiece and another at the bottom of the workpiece (10, typically wood). As shown, the workpiece is mounted on a reciprocating carriage 7, for example, and moves perpendicular to the plane of the drawing. Other motion actuators are known in the art, and include "end-dogging" carriages, "sharp chain" and "press roller" assemblies, while not limited thereto. Position may be assessed at any time using a variety of instrumentation known in the art, and a first derivative (dx/dt) may be used to determine velocity of the workpiece 10 at any time during the cut. Gullet fill curves are typically calculated by measuring depth-of-cut or are modeled from three-dimensional log models, for example.

The bandsaw is strained by applying a force on the idler wheel axle so as to stretch the sawblade. Generally this is on the order of 20,000 pounds of stress along a line drawn through the two center axles (8, 9). In addition, the bandsaw is displaced laterally by the sawguides so that a proportion of the strain is directed onto the sawguide faces (5a, 6a). The force on the bottom sawguide can be about 100 pounds, for example. Because the drive wheel pulls on the sawblade, the cutting force applied to the workpiece by the saw teeth creates additional tension in the section of the sawblade between the workpiece and the drive wheel. This section of sawblade is stretched over the bottom sawguide. Thus the bottom sawguide is advantageously used to monitor deviations from a true cut associated with overfeeding and bandsaw overpower consumption. A change in bandsaw tension on the sawguide may reflect a deviation from true cut and/or an increase in wood resistance to the cut. Resistance can be related to the density and wetness of the wood, or the grain structure, for example. Deviations can be lateral in-plane, out-of-plane vertical twists, or out-of-plane horizontal twists and can be associated with snaking and/or washboarding.

A true cut is in-plane with the bandsaw and is plumb with a line between the sawguides. Deviations from a true cut result an instantaneous proportional change in force on the bottom sawguide. By coupling the bottom sawguide (5) at a second face (5b) to a load cell assembly (12, strain gauge), the electrical signal from the load cell is used as a process feedback signal to an anti-deviation control system. Any deviations from a true cut are generally corrected by slowing the feedspeed of the workpiece onto the sawblade. As feedspeed slows, the cut will restore itself to a true path. It is desirable to be able to operate the mill at a maximal feedspeed that produces a tolerable amount of overfeeding without significant deviation from a true cut, so the feedspeed is increased to a point below a feedspeed at which incipient deviation again triggers a slowdown. This is a simple description of a feedback control loop for control of feedspeed in a sawmill.

During setup, in order to put a pre-load on the sawguides (5, 6), the sawguide front faces (5a, 6a) are forced against the blade 2 with jackbolts 32 mounted in the guide holder 13. Sawguide faces are also trued during routine maintenance to prevent twist of the blade. The guide face pressure on the load cell during operation is then directly proportional to the saw tension and will vary as saw tension increases or decreases during a cut—because the load cell is pre-stressed as described above. Between cuts, the input from the load cell is electronically zeroed and saved (as a "zero" signal) and can thus or decrease (below zero) when the blade deviates laterally away from the guide or increase when the blade deviates sideways (laterally) toward the guide, having a range from a positive to a negative value. Thus the saved zero signal represents a true cut or optimal cut line.

Linear feed of a workpiece 10 may be driven by methods known in the art. Descriptions of principles and mechanisms for moving logs are found in U.S. Pat. Nos. 4,926,917, 5,694,821, 6,382,062, and 6,681,672, for example, all of which are incorporated herein by reference as background on log motion control. Motion control mechanisms include a reciprocating carriage, sled, an end-dogging carriage, a sharp chain and a press roller assembly, for example. These mechanisms may include an apparatus for skewing or slewing the log according to its geometry as well as for driving the log through the blade (or vice versa, driving the blade through the log). But what has been lacking has been a sensor output that is immediate and predictive of cut deviation. A load cell or other force sensor operatively coupled to one or both sawguides results in a practical and sensitive apparatus and method for minimizing deviation and snaking, advantageously while optimizing feedspeed.

The electronics are described here schematically, and include a feedspeed controller circuit 14, with processor and programmable logic, having an input from a load cell 12 mechanically coupled to a sawguide and an output to a motion controller 15 and carriage drive 7 or other log handling system. Dashed lines indicate wire harnesses. Generally the circuit operates as a digital circuit, and includes an A/D converter for digitizing load cell response. Advantageously, between each cut, the digitized input from the load cell may be saved as zero. Calibration of response slope may also be performed periodically. Safety features and overrides are typically engineered into the electronics or the programming.

Figure 2A:
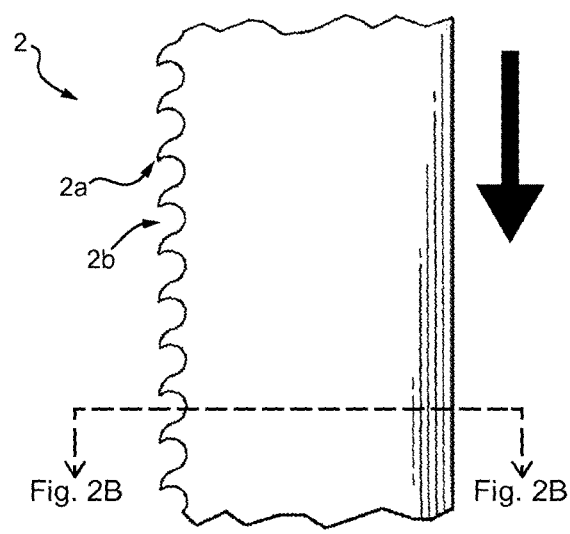
FIGS. 2A and 2B are views of a representative sawblade detail showing the toothed structure, the gullet and the kerf width.
Figure 2B:
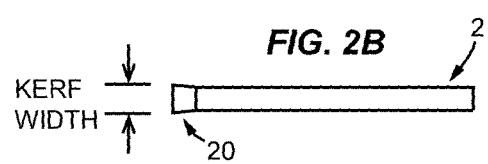
Figure 2C:
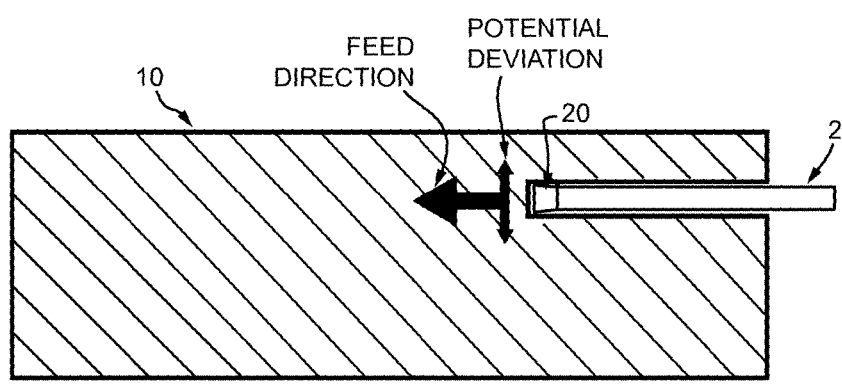
FIG. 2C is a schematic representation of a bandsaw cut through a workpiece.

FIGS. 2A and 2B are views of a representative sawblade 2 with detail showing a traditional tooth structure 2a, gullets 2b, and a kerf width at cross-section. Newer blades may have carbide teeth 20 with a characteristic wedge-shaped profile, and produce a kerf during the cut. The kerf width is established by the tooth, as shown in FIG. 2C, which is an idealized view of a bandsaw cut progressing from right to left as shown through a workpiece 10. The feed direction is on a true cut line parallel to the flat of the sawblade, but potential lateral deflections or "deviations" of the blade may be to either side of a true cut. Any deviation will result in a change in the sawguide "pressure" or "force" on the load cell and, more slowly, a lagging increase in power consumption. The increase in power requirement can be more rapidly reversed (or prevented) by correcting the deviation, and this is done by quickly slowing feedspeed until the blade resets itself on a true cut track. Similarly, snaking can be dampened by rapidly responding to any overfeed condition that increases power consumption. A "rapid response" of a feedback loop is an adjustment in feedspeed made in milliseconds or less, and PID controllers having this capacity are within the skill of the art when precise and rapid sensor input is provided as disclosed here. Cut tolerances also can be improved by using force sensor control on the guideblocks, resulting in improved lumber yields per log.

FIGS. 3A, 3B and 3C are views of a bottom "sawguide" or "guideblock" 5 and guide holder 13 with load cell assembly 30. To the left, a blade 2 is shown edge-on, vertically mounted in contact against the bottom sawguide 5. As discussed earlier, this contact is pre-stressed to enable a positive and negative response to a blade deflection either toward or away from the sawguide, respectively. The sawguide is mounted in a guide holder 13, and includes one or more jackbolts 32 for precise positioning adjustment and pre-tensioning against the blade. In this embodiment, the guide holder includes a rigid welded frame member 34 mounted on a pivot assembly 36 with fulcrum (shown is a bearing shaft 37 with pivot ears 38 and supporting baseplate 35) and translates lateral motion/force of the sawguide into vertical motion/force on the load cell assembly 30. A load bar 39 operates to pressurize the load cell, which is in a protective housing or cap 40 with dust gasket and strain limiter. A dashed line is indicated for the cutaway view of FIG. 3B.

Drawn in FIG. 3B is a setscrew 40 for pre-compressing a cap 41, the cap having a load transfer contact with a load cell 42 (or other force sensor device). The setscrew is also useful in centering the load over the load cell itself. The cap is fitted with dust gaskets (43a, 43b) and sealed to prevent buildup of grit and sawdust inside the load cell assembly (shown in FIG. 3C). The cap includes precision shoulders dimensioned to prevent overstraining the load cell. Load cells suitable for practice of the invention include a THC-500-V (compression range 0-500 lbs) obtained from Transducer Techniques (Temecula, Calif.). Generally the load cell 42 is a solid state package having four gauges wired into a Wheatstone Bridge with compensators for temperature correction. The transducer is selected for optimal linearity and response range and is wired with a power supply.

Figure 4A:
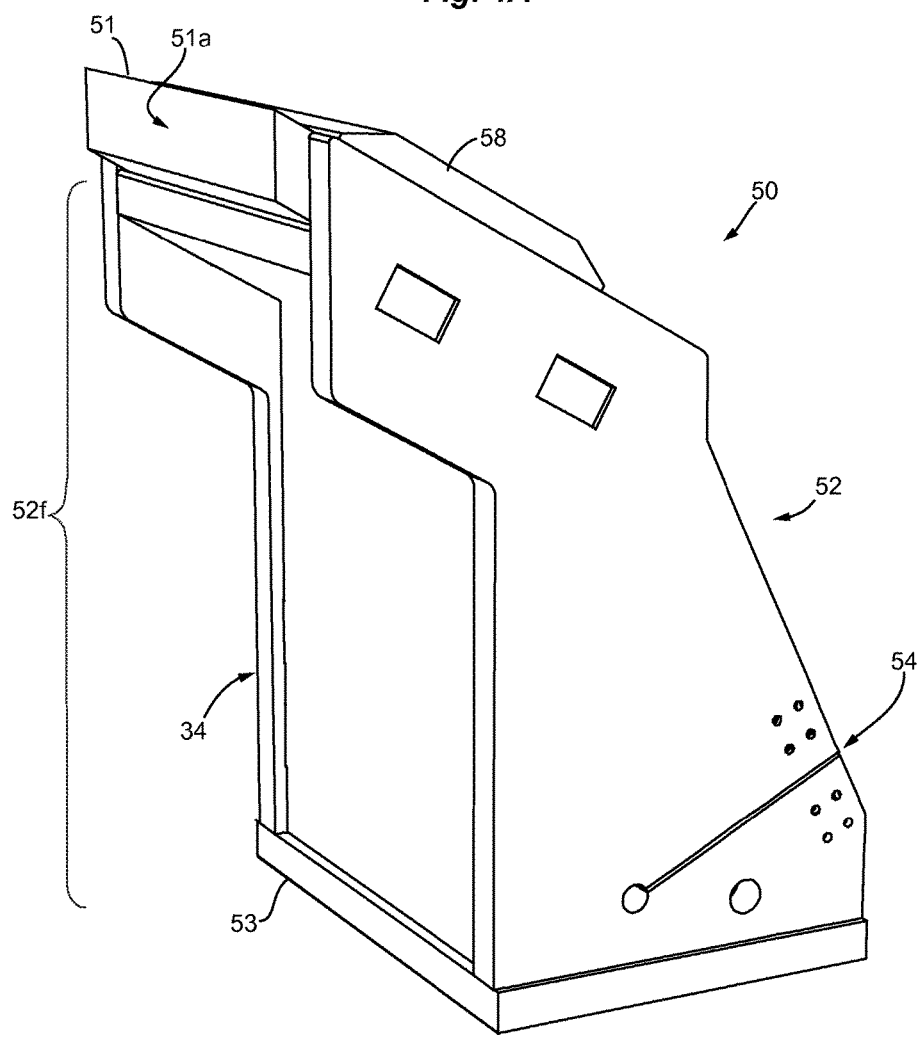
Figure 4B:
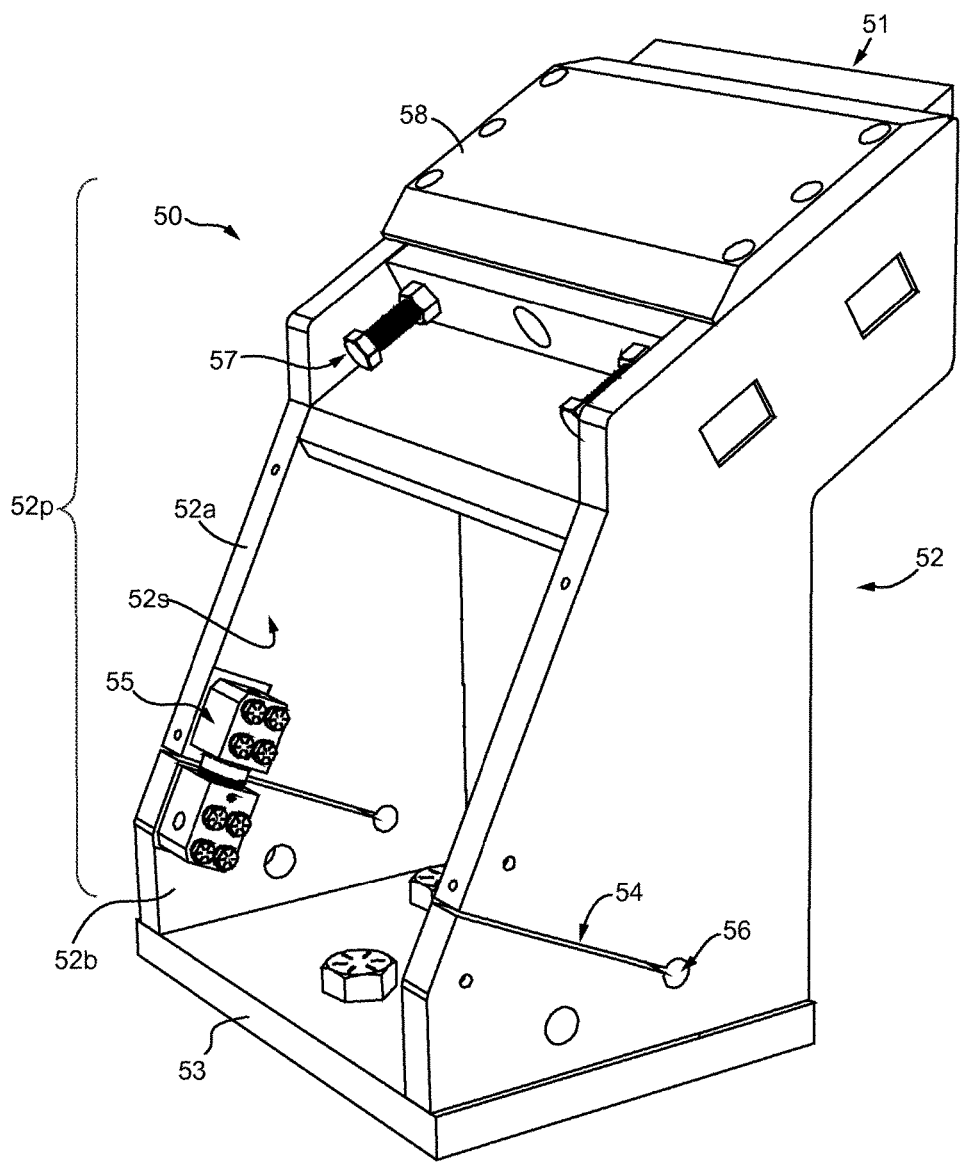

The guide holder design 13 of the preceding figures is illustrative but is not limiting in the practice of the invention in its particulars. FIGS. 4A, 4B, and 4C are perspective views of another embodiment of a sawguide and guide holder assembly 50 with force sensor subassembly 55 for controlling sawblade deviation. In these views, a novel and improved approach for anti-deviation control of a bandmill is shown in which the sawguide 51 is mechanically linked to a guide housing having stiff walls or "framing members" 52 and at least one side of the guide housing frame is deliberately weakened by a split or full-thickness cut so as to define a "strain concentration slot" 54. The slot is straddled by a load cell assembly containing a force sensor (55, FIG. 4B) at the point near mouth 54a where strain is concentrated, "focused", or "magnified". Surprisingly, although steel is a stiff material, by selecting the length and aspect ratio of the strain concentration slot 54, the radius of the stress relief hole 56, and the frame thickness, sensitivity to very low deflections of the bottom sawguide are achieved—such that a hand on the sawguide 51 can result in a readily measurable change in the electrical signal from the force sensor. Sensitivity and reliability are significantly improved over the pivot action of the mechanism of FIGS. 3A-3C and less maintenance is needed. The baseplate is no longer isolated from the frame and a pivot mechanism is no longer needed.

The guide holder assembly 50 generally includes a stiff steel body or frame 52 with baseplate 53 and supports a sawguide support member, bracket or channel, the sawguide 51 having a front face 51a that contacts the moving sawblade. The sawguide front face is typically pre-strained against the sawblade and advantageously, this permits the force sensor package to measure both positive and negative deflections of the sawblade during a cut without need for paired sensors on either side of the blade. Because blade deviations begin as the blade exits the cut, rapid propagation of the electrical signal from the force sensor to an antideviation feedback control circuit (14, FIG. 1) permits near instantaneous adjustment in feedspeed as executed by a motion control driver that operates the workpiece carriage. The quickness of any adjustment is evidenced in FIG. 10 (below), where a response to a "slip" in the workpiece on its carriage is plotted in real time.

The guide holder assembly generally includes a detachable support member or members for mounting the sawguide. The support member(s) may be fitted with adjustment bolts 57 to permit precise alignment and pre-stressing of the sawblade. Also shown here is a coverplate 58 on the sawguide support member; dust covers are used where needed to protect the load cell assembly and strain concentration slot 54 from accumulating wood solids or tar during day-to-day operation. The sawguide and support member(s) may be removed for periodic re-facing and/or changing of a sawblade. The guide holder assembly may be provided with an integral mounting plate 53 so that the entire unit may be bolted to the bandmill to aid removal during blade changes if desired.

As shown here, the framing member 52 has an upper aspect joined to the sawguide support member, a bottom aspect joined to a "base" 53, an "anterior aspect" or face (52t), and a "posterior aspect" or face (52p) where the base of the framing member includes attachment means to the bandmill, and a load cell assembly 55 such that a strain on the sawguide is readily coupled to a strain on the force sensor through the mechanical linkage. The posterior face 52p may be defined by one or more reinforcing or bracing members (52s) disposed as sidewalls on the frame, (i.e., a shoulder or edge member forming a "sidewall" of the frame that extends anterioposteriorally from the front face of the sawguide). "Anterior" and "posterior" aspects are taken with reference to the "front" defined by the front face of the saw guide.

Advantageously, any strain experienced by the framing member may be focused on the force sensor. A slot 54 or "cut" is intermediately disposed between an upper aspect 52a and a bottom aspect 52b of the sidewall 52s and extends part way (i.e., extending a part of the way) from a "mouth" defined posteriolaterally on the sidewall in a generally forward direction. The slot terminates before completely bisecting the frame. The slot pre-disposes the framing member to "flex" at the mouth of the slot, the slot having a geometry and an aspect ratio configured such that a strain on the sawguide is concentrated or focused at the mouth of the slot; i.e., flexural strain in the framing member is "magnified" at the mouth of the slot.

Generally, only one load cell assembly is needed per sawguide, although two may be used, one on each wall of the guide holder, for redundancy if desired. FIG. 4D is a cutaway view of internal structures in the guide holder assembly. The sawguide is mounted in a channel or support bracket in the guide holder and is contacted with the sawblade using paired locking and adjustment bolts (57, 57a). Additional bottom bolts in the mounting plate are used to secure the unit to the frame of the bandmill. A circular callout marks the position selected for the detailed view of the load cell shown in FIG. 6.

Figure 5:
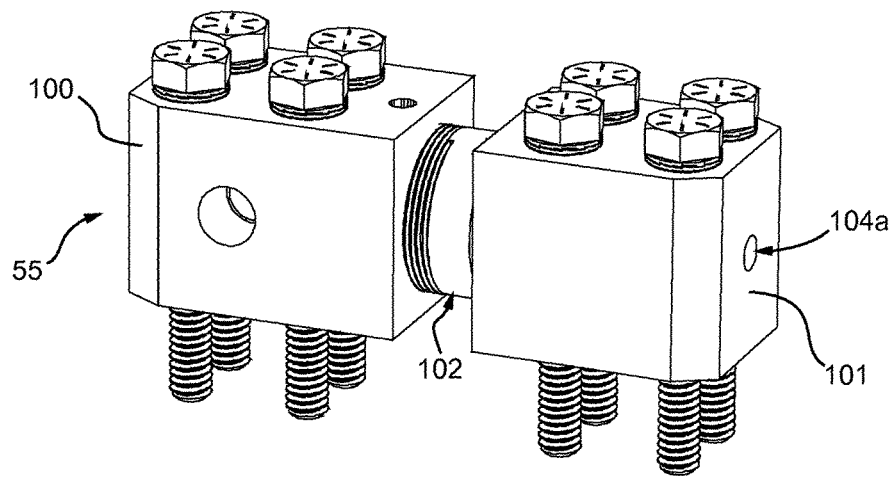
FIG. 5 is a perspective view of a load cell assembly.
Figure 6:
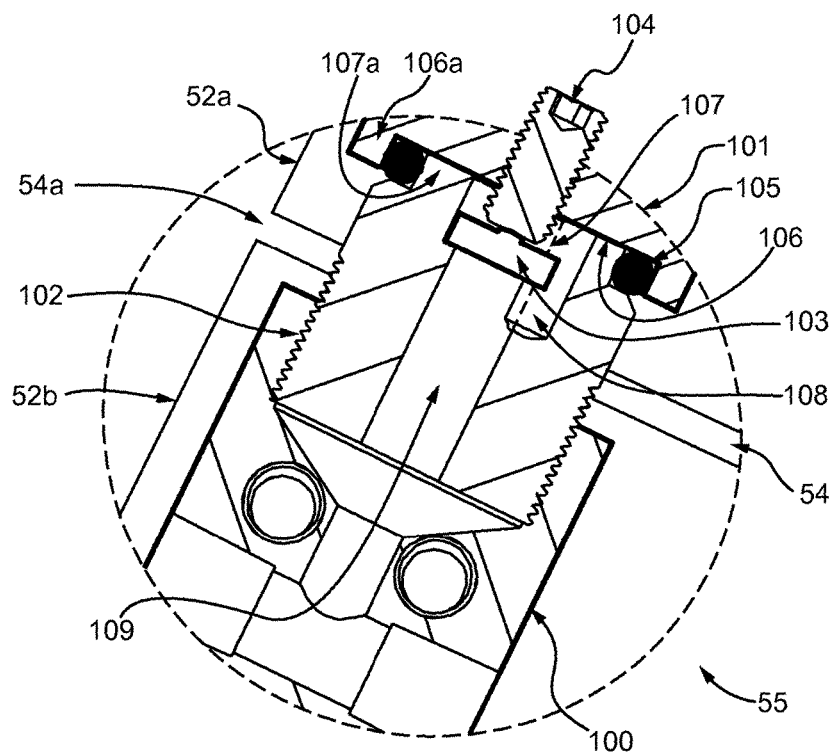
FIG. 6 is a detail of the internal structure of a load cell assembly.

FIG. 5 is a perspective view of a load cell assembly 55 to show the construction. Eight bolts secure the load cell assembly to a wall of the guide holder. "Bottom" and "top" blocks (100, 101), each with four bolts, are bridged by a cylindrical piston member 102 that mounts rigidly in the bottom block and straddles the strain concentration slot 54, as shown in more detail in sectional view (FIG. 6). Briefly, the upper butt end or head of the piston member 102 is fitted into to a piston receptacle in the top block 101, and a force transducer is captured between the piston head and the piston receptacle. As the strain concentration slot flexes, the piston reciprocates in and out of the piston receptacle, transferring the motion of the slot to the force sensor. A setscrew access portal 104a is also shown. Dust covers as would be needed in operation are not shown for clarity of view.

Any elastic compression or relaxation of the strain concentration slot is communicated through the piston member to the force sensor package, which senses the flexural deformation, and generates an electrical signal that indicates a magnitude and a direction of any incipient blade deviation or change in resistance in the cut.

FIG. 6 is a sectional view showing details of the internal structure of a load cell assembly 55. This detail view shows a "slot-straddling member" 102 (here a cylindrical "piston" member with force sensor) straddling or "bridging" strain concentration slot 54. End members (100, 101) are positioned on either side of the slot, and are termed here the "bottom" mounting block 100 and the "top" mounting block 101 simply to indicate their general position. The bottom mounting block 100 is generally rigidly affixed to the base 173 of the guide housing frame and supports the threaded piston member 102, so the motion is essentially that of the top mounting block 101 such that the piston head is reciprocated in and out of the piston receptacle 106. A raised lip 106a defines the piston receptacle. The piston is threaded into the bottom mounting block and acts on a force transducer (103, force sensor package) pinned between the head of the piston and the setscrew 104 of the top mounting block.

The raised lip 107a or surrounding wall defining force sensor cavity 107 is dimensioned and aligned precisely to protect the transducer from excessive compression by limiting travel of the head of piston member 102 relative to the piston receptacle 106. An "O-ring" 105 is sealingly disposed between the female inside wall of raised lip 106a and the male outside wall of the precision lip 107a of the force sensor cavity to prevent entry of foreign matter from disturbing the force sensor linkage. Bore 108 is milled to accommodate the wiring harness attaching to the force sensor, which exits the load cell assembly via conduit 109 or as otherwise would be convenient to make an electrical connection with a feedback control loop circuit 14.

Any elastic compression or relaxation of the strain concentration slot is communicated through the end members to the piston member to the force sensor package, which senses the flexural deformation, and generates an electrical signal that indicates a magnitude and a direction of any incipient blade deviation or change in resistance in the cut.

The strain concentration slot 54 is sized to maximize sensitivity and linearity while resisting failure; and when properly configured, the touch of a hand on the guide can activate a voltage output from the sensor. The slot is a full-thickness cut through the supporting guide housing wall or frame and divides the framing member into an upper section 52a and a lower section 52b. The lower frame section is rigidly contiguous with the baseplate 53 of the housing; the upper frame section is rigidly contiguous with the sawguide mount, but the two sections may flex or "breath" at the strain concentration slot, which is pre-stressed during setup by forcing the sawguide into the blade and displacing the blade, typically with a lateral displacement force of about 100 pounds. A wire harness (not shown for clarity) connects the sensor output to a processor or an A/D converter of a feedback loop/motion control circuit.

Note that any change in the sawguide tension results in a change in the width of the slot 54 and is communicated by a slot-straddling piston member 102 to the force sensor package 103. The strain concentration slot is disposed between an upper aspect and a bottom aspect of the housing or "frame member", the slot extends from a mouth 54a in the front face of the frame member and part way to the back of the frame member such that the aspect ratio and dimensions of the strain concentration slot are configured to distribute flexural strain in said framing member to the mouth, where the force sensor is placed. The mechanical stack is thus not rigid, but flexes at the slot, and the slot is a dynamic part of the mechanical linkage joining the sawguide to the force sensor.

Describing the mechanical linkage of FIG. 6 in more general terms, the mechanical linkage comprises a sawguide housing assembly for mounting the sawguide on a bandmill, such that the sawguide housing assembly comprises a sawguide support member atop a framing member, the framing member having an upper aspect joined to the sawguide support member, a bottom aspect joined to a base, a front face or aspect and a back aspect, and further having a strain concentration slot 54. The strain concentration slot is typically cut into the frame and is disposed between the upper aspect and the bottom aspect of the frame member, the slot extending from a mouth 54a in the front face part way to the back, the strain concentration slot having an aspect ratio and dimensions configured to distribute flexural strain in the framing member to the mouth, where any strain is concentrated on a load cell assembly containing the force sensor.

The load cell assembly as shown includes a first end member (100) rigidly attached at one end on a first side of the slot proximate to the mouth and a second end member (101) rigidly attached at an opposite end on an opposite side of the slot proximate to the mouth, the load cell assembly further comprises a slot-straddling member (102) disposed between the end members and a force sensor (103) disposed between the slot-straddling member and one of the end members, such that the slot-straddling member is enabled to transfer any elastic compression or relaxation of the strain concentration slot through a mechanical linkage to the force sensor.

Figure 11A:
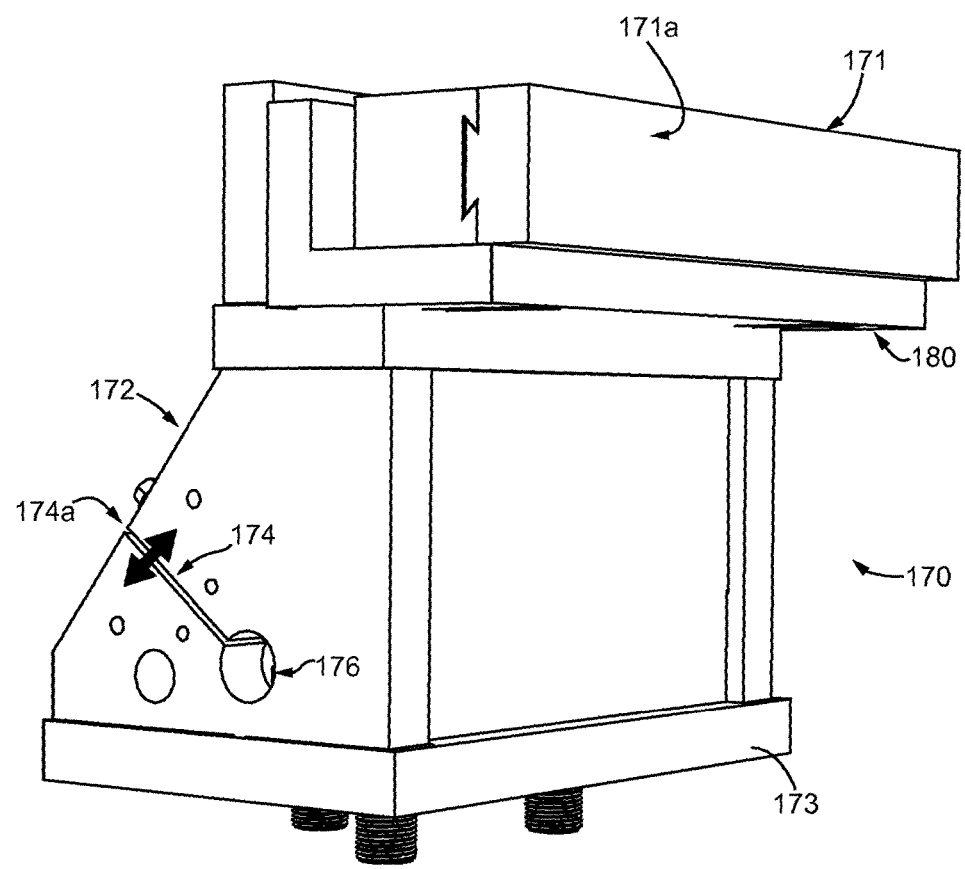
FIGS. 11A and 11B are perspective views of yet another guide holder embodiment of the invention.

A similar strain concentration slot 174 is illustrated in FIG. 11A but is dimensioned differently to reflect the differences in strain distribution necessitated by the smaller lever arm of the sawguide housing and the essentially right angle bend of the sawguide support member 180 relative to the base 173. Thus the distribution of deviation force around the strain slot is an engineered feature of the anti-deviation control systems and is a technical advance in the art.

Figure 7A:
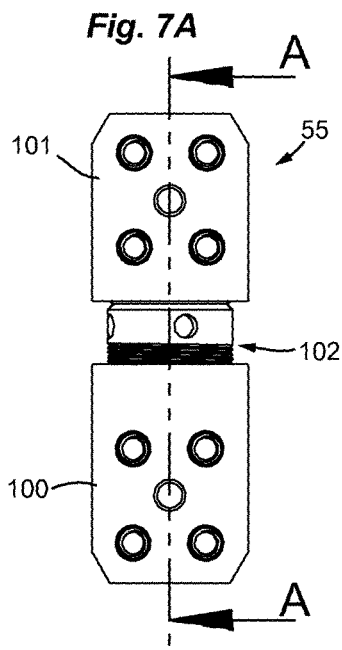
FIGS. 7A, 7B, 7C, and 7D are mechanical views of a load cell of the invention.
Figure 7B:
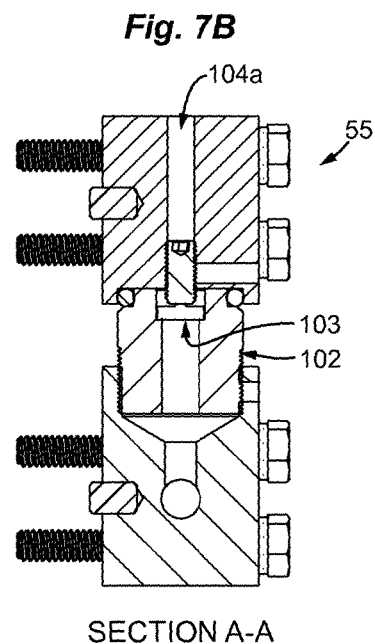
Figure 7C:
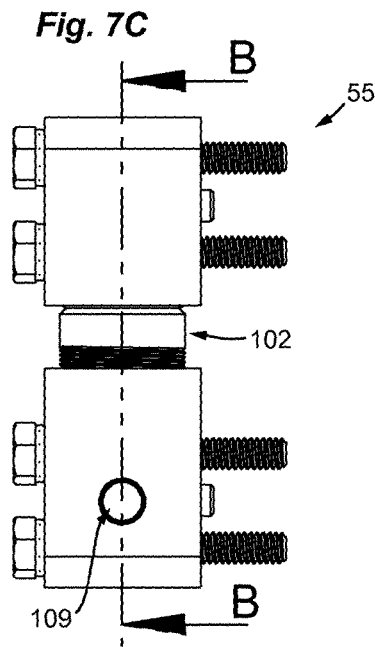
Figure 7D:
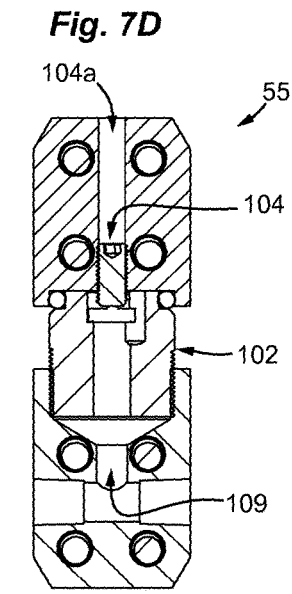

FIGS. 7A, 7B, 7C, and 7D are mechanical views of a load cell assembly. The load cell mounting blocks are bolted to the wall of the guide holder, each by four bolts as shown in FIGS. 7B, 7C and in FIG. 5. After assembly, adjustments are made to the setscrew 104 (shown in section in FIGS. 6, 7B and 7D) so as calibrate the force sensor package.

The anti-deviation control systems of the invention may also be operated with paired force sensors. FIG. 8 is a schematic representation of an industrial twin bandmill 120 having two sawblades operating together, each sawblade having a sawguide force sensor unit. The two force sensors are typically electronically coupled to a single feedspeed controller. Feedspeed of the workpiece is reduced if the deviation of either of the two blades exceeds a preset limit and may be coordinately increased for both sawblades to a point of "incipient deviation" according to the teachings of my invention.

In this view, two bandmill blades are paired to operate on a single workpiece 10, which is moved between the blades on a motorized chain drive 124 having log press rollers (125a, 125b) mounted on either side. The press roll motors and chain drive are configured to provide clearance for the blades, and may be adjusted so as to provide the desired width of cut. Stock is typically run through a side chipper to prepare side faces that have been smoothed and squared prior to being fed into the press rollers. Other carriage mechanisms for conveying a workpiece through a bandsaw may be controlled by a motion controller equipped with an anti-deviation feedspeed control system and the force sensors of the invention.

Both bandsaws are provided with force sensors (130a, 130b) operatively coupled to the respective bottom sawguides (132a, 132b). Each sawguide is mounted in a guide housing assembly (134a, 134b). Each blade is pre-tensioned by adjusting the sawguide relative to a plumb line connecting the drive and idler wheels (126, 127, 128, 129), which spin so that the blades are counter-rotating. Each sensor operates independently on a single sawblade, but the feed motion controller circuit is configured to always respond to the cut on the side that has the highest absolute guide pressure at any instant.

While not shown, one skilled in the art will recognize that quad bandsaws may be operated using four force sensors and that the controller circuitry of the invention may be readily modified to include four inputs, and so forth. Each sensor output is independent, but is processed to control workpiece feedspeed according to coordinated instructions. Typically for multi-blade operation, a force will be calculated that allows for adjustment of workpiece feedspeed based on the maximal incipient deviation of any one of the blades at any particular moment in time. Blades operated serially may also be controlled by a force sensor feedback control system of my invention.

Figure 9:
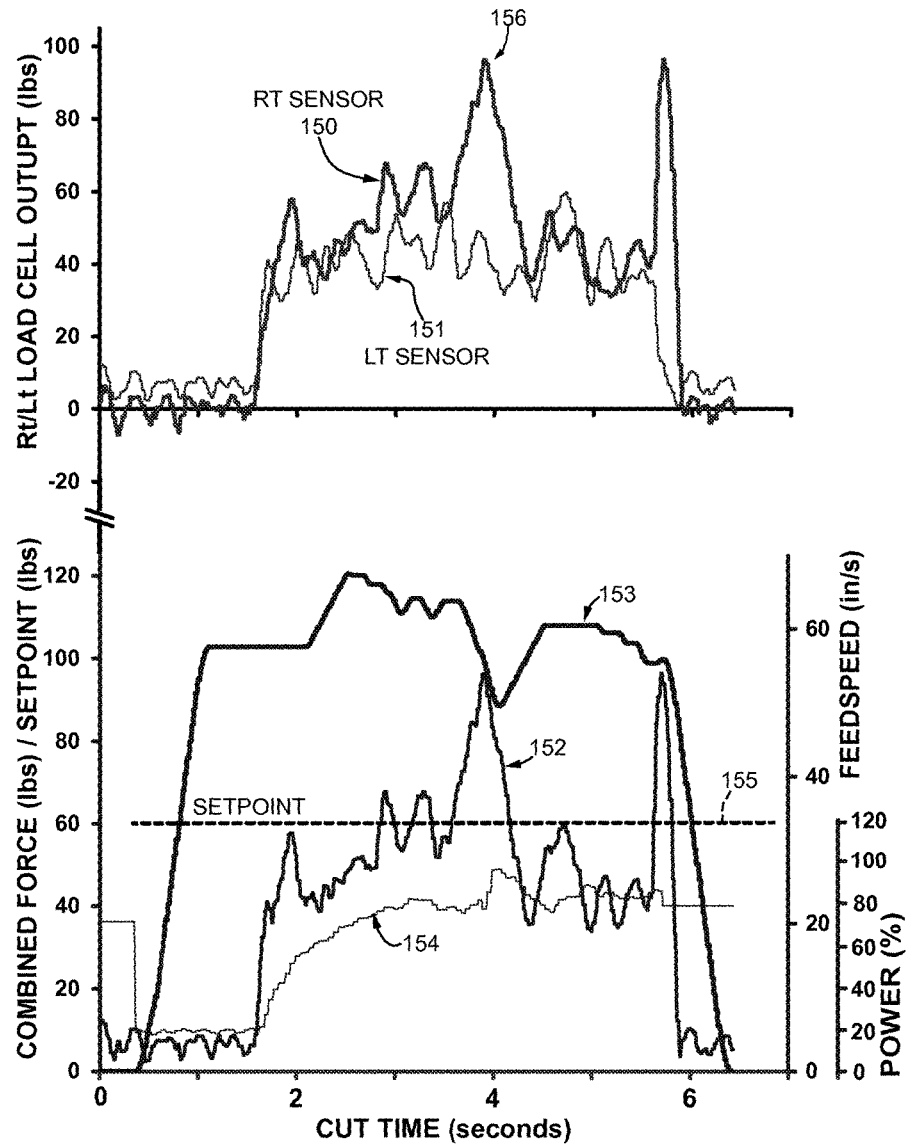
FIG. 9 illustrates force sensor data and operating parameters collected during operation of a twin bandmill when cutting a workpiece, here a log about 16' in length.

FIG. 9 illustrates realtime data logged during operation of a twin bandmill when cutting a workpiece, here for example a log of about 16' in length. Shown are curves (150, 151) for force sensor output of a right (Rt) and left (Lt) force sensor, a combined force output calculation (lbs) that combines both sensor inputs (152), a feedspeed control trace (153, in/s), and power output (154, %). Also shown is a limit setpoint (155) at 60 lbs on the combined force scale and at 120% on the power scale.

In a working example, the voltage or current output of the force sensor may be converted by an A/D converter to a 12-bit value between 0 and about 4096. Typically the force sensor signal is electronically zeroed between log cuts. Where the force on any one of the blades exceeds a programmable limit, a feedspeed optimization algorithm of the feedspeed controller circuit overrides any depth-of-cut or other speed algorithm in use, and the resulting workpiece feedspeed is reduced as needed until the deflection is resolved. Any corrections are proportional and when the correction is successful, feedspeed control is quickly released so as to return to the maximum optimal speed. Typically there is no slowing of the sawblade drive (i.e., any changes in power will lag the deviation control of the force sensor feedback loop) during the correction. Systems having 8-bit, 16-bit, 32-bit, or 64 data may be adapted for use if desired, without limitation thereto.

The plot shows the quicker reaction of guide force 152 as opposed to bandmill power consumption 154, which is relatively steady for the duration of the cut. Response in the power curve lags the force sensor trace. Here the force sensor trace shows a strong spike or peak (156, Rt sensor) in this cut, resulting in a corrective slowing of the feedspeed command parameter 153, before a modest increase in power consumption is initiated. (Both peaks then decrease.) The force sensor output drops below its setpoint line (60 lbs on the left axis) and power consumption parameter 154 never exceeds its setpoint (120% on the right axis). If needed, the controller will reduce the feedspeed before the power exceeds its limit, but excessive reductions of speed or over-correction are generally avoided by the faster reaction of the guide force sensor(s). Blade tension manifested by cut resistance also manifests as a deflection force on the guide sensor, permitting dual control of deviation and/or power overage with dual setpoints.

Figure 10:
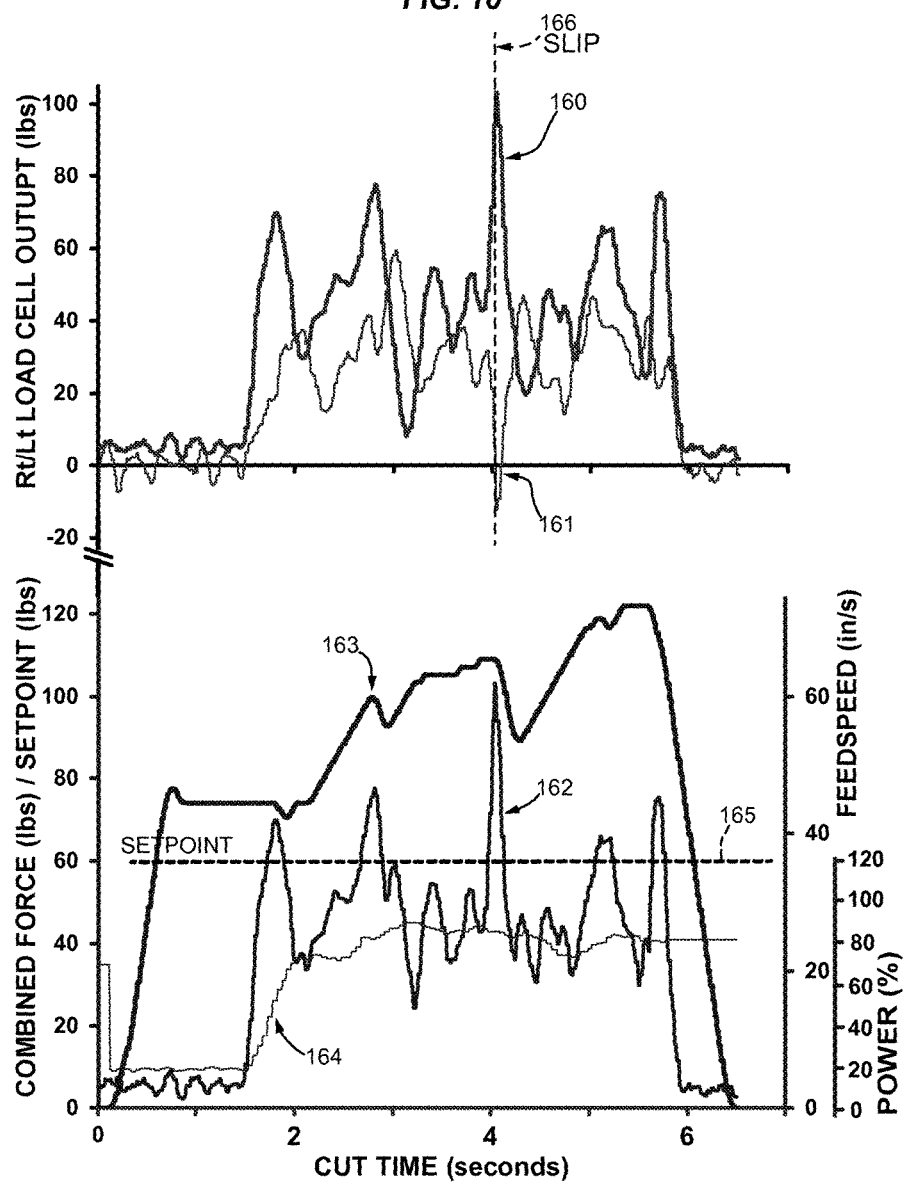
FIG. 10 illustrates data collected during operation of a twin bandmill, and shows an anomaly associated with an overhead end-dogger feed system, the feed system having a mechanical problem that allows the log to slip during the cut. Shown are the paired force sensor outputs on the two blades and related feedspeed operating parameters in real time.

FIG. 10 illustrates data collected during operation of a twin bandmill, and shows an anomaly associated with an overhead end-dogger feed system, the feed system having a mechanical problem that allows the log to apparently slip during the cut (166, dashed line marked, "SLIP"). Shown are the paired force sensor outputs on the two blades and related feedspeed operating parameters in real time. Shown are curves (160, 161) for force sensor output for a right (Rt) and left (Lt) force sensor, a combined force output calculation (lbs) that combines both sensor inputs (162), a feedspeed control trace (163, in/s), and power output (164, %). Also shown is a limit setpoint (165) at 60 lbs on the combined force scale (120% on the power scale).

The anomalous lateral movement (166, SLIP) of the log in the cut line is manifested by a sudden change in the force on the two contralateral guides: each force sensor reacts by about the same amplitude—but in opposite directions. This would be consistent with a log that slips laterally or rotates while being fed through the twin bandmill, resulting in a sudden strain on the blades. Due to the millisecond response of the force sensors, the velocity curve shows an immediate slowing of feedspeed when this occurs. Following stabilization of the log, there is a rapid return to depth-of-cut limited (i.e., normal) operating conditions. Surprisingly, power consumption 164 is unaffected in this example, so that sawblade motor velocity is essentially constant during the correction, serendipitously having the effect of saving power while improving accuracy of the cut and the quality of the resultant lumber. Here the setpoint line also intersects the POWER (%) axis, and power in excess of 120% would trigger a reduction in motor speed.

The timescale and sensitivity of these adjustments exceed the capacity of an operator to make corrections, and do not require an operator to guess at the nature of the problem causing the adjustment or to override the system. Deviations of the blade are corrected automatically without interruption of the cut. The fully automated feedspeed controller system of the invention, with real time anti-deviation control, is a technical advance in the art and has realized real time increases in productivity when installed on industrial bandmills.

Figure 11B:
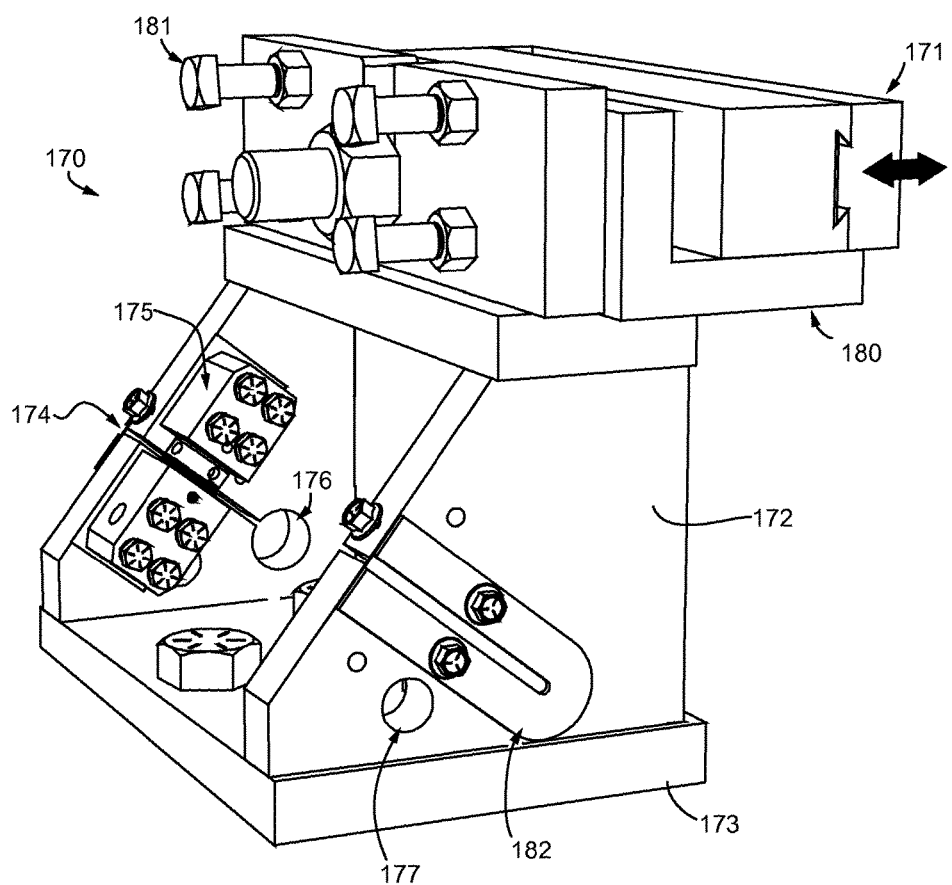

FIGS. 11A and 11B are illustrations of yet another inventive embodiment 170 of a guide housing assembly having a force sensor mechanically linked to the sawblade through a bottom sawguide. The bottom sawguide is preferred because any force changes associated with deviation from a true cut are detectable first where the blade leaves the cut.

Here the sawguide front face 171*a* is essentially normal to the sawblade and is mounted in a detachable rail or support bracket 180 that is removably mounted to the sawguide housing. This embodiment demonstrates that the dimensions and shape of support member 180 and framing member 172 may be customized to fit a customer's sawguide housing. Any adjustments in the lever arm of the sawguide support member relative to the base may require analysis of strain distribution in the frame and re-engineering of the strain concentration slot 174 as shown (compare FIG. 11A with FIG. 4B). The slot is a full-thickness cut through the framing member. The aspect ratio of the slot is calculated so that an effective strain concentration on the load cell assembly (which straddles the slot) is achieved.

Compression or relaxation of the force on the sawguide (double-headed arrow) is translated into flexion of the housing walls at the mouth 174*a* of the strain concentration slot 174. Flexion of the walls 172 follows an elastic modulus of the frame material (generally steel). Flexion is aided by a stress relaxation hole 176 that prevents uneven concentration of flexion loads. The resultant force vector determined by the anti-deviation controller circuitry (14) is dependent on whether the blade is deviating ("deflecting") toward or away from the sawguide front face, i.e., the electrical signal after processing may be positive or negative, capturing the magnitude and direction of any blade deflection. The blade is pre-stressed and at rest between cuts is non-zero, but zeroing is performed digitally before a cut is initiated. An absolute value of the output signal may be used for further processing if desired.

The sawguide support member and frame member thus act as a mechanical linkage between the sawguide and the force sensor. Also included in the mechanical linkage shown here is load cell assembly 175 with force sensor mounted to straddle or bridge the strain concentration slot. One of two ends of the load cell assembly is rigidly attached on each slide of the slot, a slot-straddling member is disposed between the ends so as to straddle the strain concentration slot, and the force sensor is disposed between the slot-straddling member and one of the ends, such that any elastic compression or relaxation of the strain concentration slot is coupled to the force sensor. The linkage stack thus formed mechanically conveys very small changes in the slot width to the force sensor.

Any elastic compression or relaxation of the strain concentration slot is communicated through the end members to the slot-straddling member to the force sensor, which senses the flexural deformation, and generates an electrical signal that indicates a magnitude and a direction of any incipient blade deviation or change in resistance in the cut.

Details of a representative load cell assembly were described in FIG. 5 through FIG. 7 and another embodiment was described in FIGS. 3A-3C. Sawguide faces are periodically resurfaced as part of routine maintenance of the bandmill and the force sensor output is typically re-zeroed between each log. Routine maintenance may also include a calibration of the slope of the response. Adjustment bolts 181 are provided for periodic realignment of the support bracket or member 180. Also shown here is a dustcover 182 of a pliant material fastened over the strain concentration slot to prevent ingress of sawdust or oil during regular operation. A wire harness exits the guide housing assembly at 177 either to the right or the left side of the housing and is typically provided with a strain relief bung to seal the outlet. Bolts in the base 173 of the sawguide housing permit removal for maintenance.

While the preferred embodiments illustrate a mechanical linkage between the bottom sawguide and the force sensor, hydraulic linkages may also be employed. With further development, electromagnetic linkages, such as through magnetic attraction, may be adapted for use with the anti-deviation feedback control loops of the invention. The force sensor itself is preferredly a load cell or strain gauge, but may also be a pressure gauge, a piezoelectric device, a capacitive device, a proximity sensor, or a Hall-effect device.

More generally, the apparatus and methods of the invention are embodied by incorporation of the force sensor, anti-deviation control subsystem, and motion controller subsystem with motion drivers into a feedback control loop enabled to reduce workpiece feedspeed in order to to counter, reduce, or oppose an overfeed condition or an overpower condition, and enabled to increase or maximize workpiece feedspeed when deviation of the blade is not significant.

Figure 12:
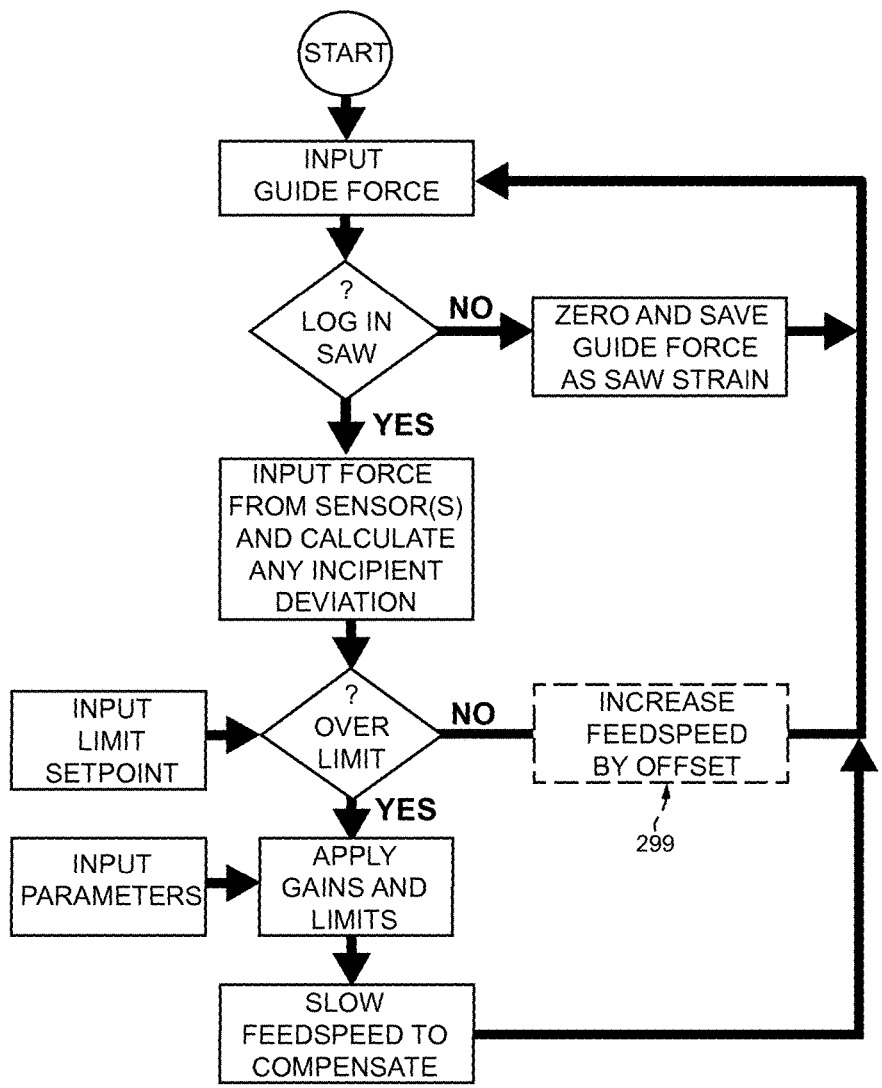
FIG. 12 is a schematic block diagram of components of a software package used in anti-deviation feedback control of feedspeed.

FIG. 12 is a schematic block diagram of components of a flowchart, including elements of a software package 190 or firmware used with a computer or any processor-implemented logic circuit for anti-deviation feedback control of workpiece feedspeed. In general terms, the flowchart is designed to show how a process control method is implemented, where a central element is real time measurement of a force or pressure on a sawblade, the force measurement being used to sense and correct any an incipient deviation from the ideal or "true" cut path through a workpiece, taking into account wood condition, mechanical factors in the saw and carriage, blade condition, and energy consumption.

The method involves generating an analog signal from the force sensor and digitizing the signal, generally with an A/D converter that may be part of the transducer package or may be included in an anti-deviation controller circuit. An absolute deviation (to the left or right, or a tensioning of the blade due to twisting) is anticipated in the force data and a corrective adjustment is made to workpiece feedspeed, generally by issuing an instruction to a motion controller. Generally at least one feed position coordinate is monitored for configuring instructions to the motion controller. The circuit and output of the sensor may be periodically zeroed or recalibrated, such as between cuts. When cutting, the guide force is monitored and a calculation is made to combine one or more force measurements from one or more sensors, generally one per blade of a twin or quad bandsaw.

The decision to make an adjustment, in the case of a negative feedback control loop by slowing feedspeed, is made by comparing an input force limit setpoint and calculating a reductive adjustment in feedspeed according to gains and limits supplied to the program. Sudden process changes, such as when the blade encounters a knot or a twist in the wood grain will also cause the controller to back off feed rate for an instant, and then ramp back to maximally achievable feedspeed as soon as conditions permit, thus operating as a feedback loop.

Once the incipient deviation is corrected, feedspeed may be returned to its programmed default, and for example is often advantageously controlled (absent any incipient deviation) by a depth-of-cut subroutine or program also operatively linked to the motion controller.

Advantageously, reaction time of a human operator is less of a limitation, over-correction and under-correction are reduced, and a significant gain in overall productivity is enabled by use of the inventive systems and methods.

Corrections made based on sensor output may be processed at a rate limited only by the clock speed of the processor, and thus the operation of the blade on the workpiece may be adjusted at an essentially instantaneous rate.

A positive feedback subroutine may also be applied 299, so that feedspeed may be increased by an offset when conditions are favorable and gullet fill is not exceeded. Positive and negative feedback loops may be combined and may operate cooperatively with feedspeed control by depth of cut, gullet fill, or log modeling as described in FIG. 13.

Figure 13:
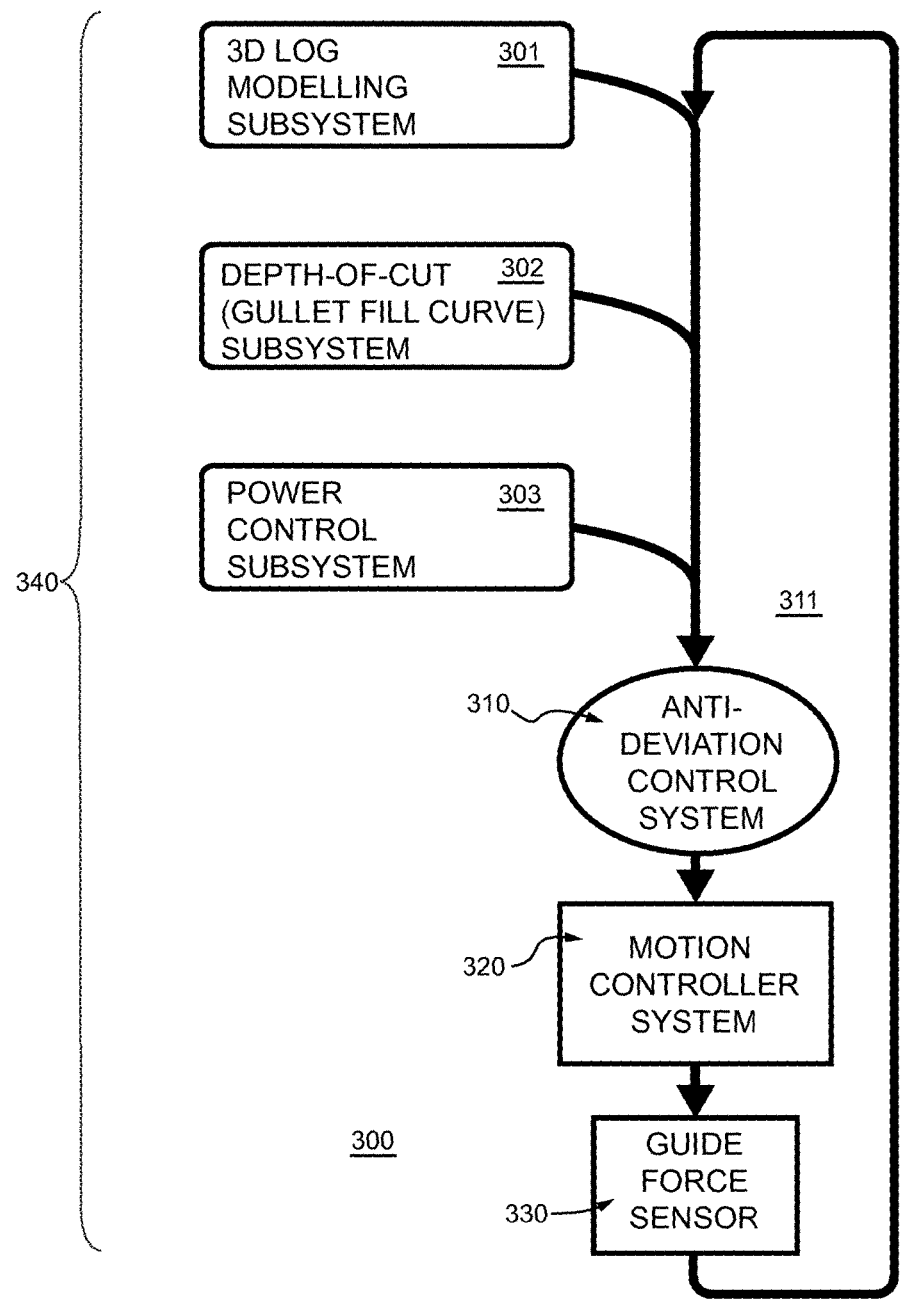
FIG. 13 presents a schematic view of multiple functional blocks of a novel combination system for saw control.

FIG. 13 is a schematic view showing functional logic blocks of a bandmill control system 300 having an anti-deviation feedback control subsystem or function. Master control software architecture is fundamentally altered by the capability to directly sense and essentially instantaneously correct sawblade deviation by modifying output commands of the motion controller 320 that drives the workpiece through the blade (or vice versa). In conjunction with force sensor control, a number of complementary control features may be interacted as a software package to improve lumber production: these may include a log modeling control subsystem (301, measuring log dimensions and taper, then projecting an optimized cut, including slew and skew cuts, through the saw based on fullest use of the log mass), a depth-of-cut control subsystem or function with gullet fill curve calculation 302, a saw power control subsystem or function 303; any or all of which may be combined with an anti-deviation control subsystem for function 310 by sensing sawblade force on a force sensor 330 directly coupled to the sawguide as described here and incorporating the real time data into a feedback loop in the program subroutines or functions. In combination 340, each functional block contributes to optimized instructions executed under command of the motor controller subsystem 320, thereby forming a feedback loop 311.

Three-dimensional log modeling, depth-of-cut measurement (or calculation), gullet fill calculation, and power control are practiced by a variety of methods known in the conventional art. The improved feedspeed controller system achieved by using a sawguide force sensor operatively contacted to the sawblade as disclosed here is novel. Sensor guide force measured as the log exits the blade is synergic with and superior to the conventional methods of saw control and is used to reduce snaking and washboarding and to increase production. Force sensor control at the cut exit has a faster response time than power control, but is complementary because power control may be needed to prevent over-power in, for example, dense wood, even when a true cut is maintained. Many conventional saws rely on constant RPM control for saw speed and will increase amperage to an upper limit when increased resistance is encountered. Output of the system(s) is generally in the form of an instruction to a motion controller circuit 320.

Gullet overfill is likely to promote deviation and is conventionally controlled by a calculation based on log modeling, depth-of-cut, and/or operator experience. In contrast, force sensor control is based on an actual measurement and rapidly responds to gullet overfill by detecting incipient deviation. As wood spills out of the gullet in the cut, it tends to push the blade to one side or another and can be detected by a force sensor in real time as described here. Thus force sensor control of the invention improves bandmill operation by providing faster responses than power monitoring can provide, and senses actual deviations before they become significant, rather than relying on a calculated value or a "blind cut", an advance in the art.

Integrations 340 of the inventive systems and methods with conventional functional features of motor driver control of log cutting operations are anticipated. These integrations include control systems and software having combinations of guide force sensor control and one or more of log modeling, gullet fill, and power control. Log modeling, depth of cut and gullet fill functions may be used individually on a machine, or may be used in integrated combinations not shown here. Methods of optimizing sawmill operation will benefit from a combination of operational controls, which may be superimposed as separate functional subsystems or integrated into a single functional system with feedback control if desired. Generally the control system includes monitoring and display functions to assist an operator and management in assessing performance and scheduling maintenance tasks such as changing of a sawblade or trueing the guide faces.

The features of the invention are generally best implemented by a digital controller or computer having at least one processor, I/O functions, and at least one memory device enabled to execute programmable instructions and receive feedback data. While conventional motion controllers may be used, integration of the anti-deviation feedback control systems of the invention may require modifications of the programming. Advantageously, an improved graphical user interface may be implemented with the new features, and data for serial log cuts (FIGS. 14, 15) may be analyzed to show increases in productivity (FIG. 16).

Figure 14:
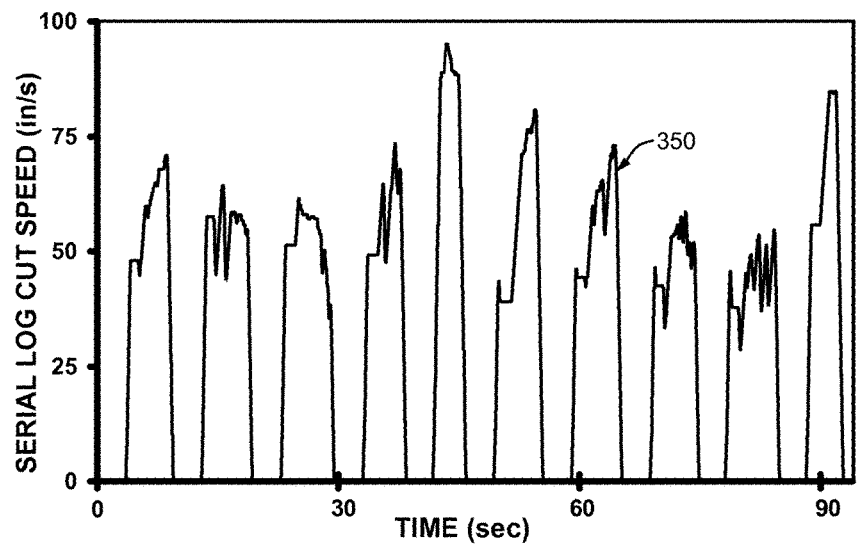
FIG. 14 is a realtime plot showing feedspeed during a series of cutting cycles such as recorded in Example I.

FIG. 14 illustrates performance of the apparatus of FIGS. 4A through 8 over the course of multiple log cuts. Each cut signature 350, where workpiece motion (in inches/sec) is controlled with the anti-deviation feedspeed systems and methods of the invention, is an individualized signature for each log because each log has a unique taper, length, grain structure, wetness and density, all of which impact forces on the sawblade in the cut. Process control incorporating a feedback control loop based on sawguide force sensing is an advance in the art and is manifested in these fully automated cut signatures.

Figure 15:
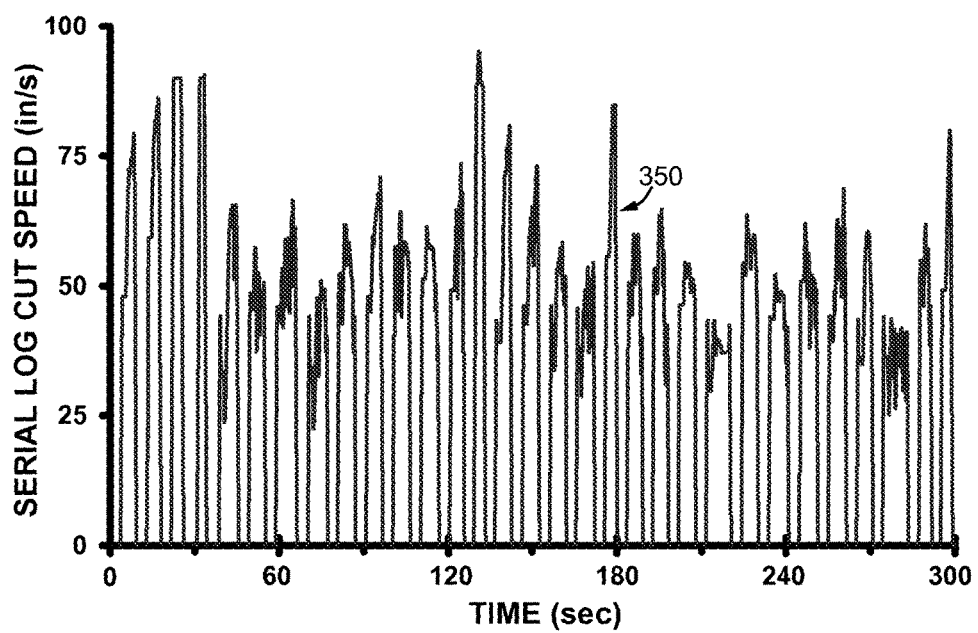
FIG. 15 shows cut signatures for an automated thirty log series using the force sensor feedspeed control loop of the invention.

FIG. 15 shows an extended series of cuts, including thirty logs. As before, each cut has a unique motion control signature 350. Because deviation of any blade is instantly corrected, overfeeding is consistently reduced, leading to increases in productivity, more consistent feedspeed, and better control of product tolerances (more efficient use of each log).

Figure 16:
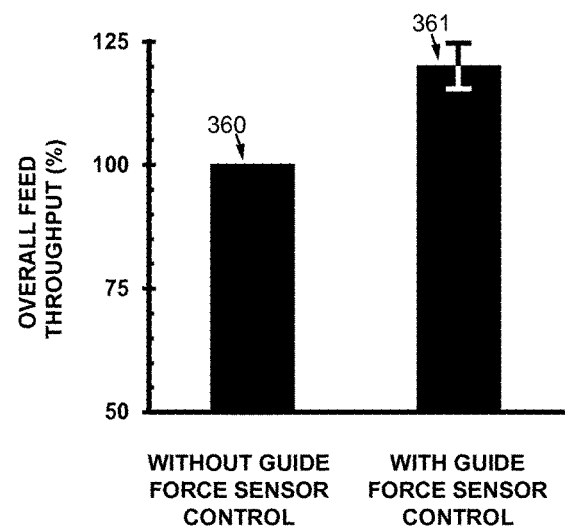
FIG. 16 is a bar graph showing a 20% gain in productivity, measured as log throughput, during early testing of an embodiment of the inventive systems.

FIG. 16 is a bar graph that quantitates overall efficiency and gains in production throughput that were achieved by implementing force sensors on the blade guides, leading to optimization of feedspeed feedback control and improvements in product cut tolerances. Shown is baseline performance 360 by a conventional system versus performance 361 with a guide force sensor control system of the invention. These gains are about 20% overall in actual production, using only a negative feedback control loop to prevent deviation. Use of positive feedspeed control is also possible, and may lead to further gains in throughput and productivity.

Further refinement may be achieved by adjustment of ramping parameters (including accelerometry), wood parameters, and PID control parameters. The feedback loop may include subroutines, such as a subroutine for dampening hysteresis and another subroutine for starting and stopping a cut, or for displaying alerts to an operator, such as an alert to schedule a blade change. Also useful are emergency shutdown routines, such as for a jam or break condition of a blade due to log slippage.

Improvement is also possible by implementing "smart" routines that include machine learning. The ideal saw feedspeed is the speed at which an optimum percent gullet fill is achieved. When the gullet of a sawblade is overfilled, the chips will be forced out the side of the gullet, causing the saw to start deviating laterally from its path. An ideal gullet fill will change with wood species, dryness, saw shape and saw condition, all of which affect the way the wood chips pack into the gullet. The system of this invention may be implemented to learn and adapt to these conditions by early sensing of saw deviation.

According to another embodiment of the invention, the gullet fill constant is established first by setting a starting default or baseline speed for a reference depth-of-cut and sawguide pressure or force. The learning algorithm then adjusts the reference speed according to the sawguide sensor signal, decreasing the reference speed because of excessive deviation or increasing it because of no deviation. The system speed will learn with each log at an adjustable rate. The learning algorithm uses a number of conditions that must be met for learning to occur. As a supplemental input, cutting depth measurements are taken at a defined incremental distance along the log as know in the art, for example with reference to U.S. Pat. No. 6,681,672 to Myrfield, co-owned by the inventor.

The following are conditions for increasing the baseline or reference speed:
1. Deviation is less than the deviation limit;
2. The system speed is less than the maximum sawing speed;
3. The operator or master speed is greater than the system speed;
4. The depth-of-cut is less than the maximum learning depth parameter;
5. All of the above conditions are true for a set number of depth measurements, not including the first predetermined number of entry depth measurements.

The following are conditions for decreasing the default speed:
1. Deviation is greater than the deviation limit;
2. The depth-of-cut is less than the maximum learning depth parameter;
3. Power (amperage) exceeds a pre-determined setpoint;
4. All of the above conditions are true for a set number of depth measurements, not including the first predetermined number of entry depth measurements.

A number of "slider" adjustments may be provided on a computer display provided by the feedspeed control program, allowing adjustment of parameters than can be adjusted by the operator or the production personnel. These adjustments may be made by clicking on a slider pointer with the mouse and sliding it to the new position on a graphical user interface, for example. No reprogramming of raw code is necessary.

An Approach Maximum Speed slider adjustment will limit the manual speed before reaching the saw. The Saw Speed Maximum slider adjustment limits the saw speed. The system speed will be calculated for a constant gullet fill based on a depth-of-cut, up to the Sawing Speed Maximum.

An Entry Percent Speed slider adjustment determines the speed at which the log will enter the cut. This percentage is taken of the first cutting depth speed calculated, and provides dampening to prevent excessive deviation due to the shock of the initial loading of the saw as it enters a log.

A Deviation Limit slider adjustment is the amount of deviation at which the system starts immediately decreasing the speed to minimize the deviation. Speed will be decreased proportional to the deviation by the amount set in the Deviation Effect Percent slider adjustment, which limits the decrease to a percentage of the speed being requested by the depth-of-cut. This subroutine, which is controlled by the setpoint limit for the force on any one of the sawblade(s), is described generally in FIG. 12, and is activated by an incipient deviation to either side of the blade true cut line, but does not require optical tracking.

A Learn Rate slider adjustment may also be included in the software. The Learn Rate slider is the amount of decrease to the Speed Reference because of excessive deviation or increase because of no deviation. A Speed Reference is used for calculating the system speed for a constant gullet fill. The Speed Reference slider adjustment is the starting point or the reset value of the Speed Reference, which is the feed rate for a fixed depth-of-cut. The adapted Speed Reference value is displayed to provide an indication of the condition and assist in determining a starting value for different wood species. It would normally be reset to the starting value when a saw change is done, because it will normally decrease as the saw gets dull.

The resolution of sawblade deviation measurement must be within a few thousandths of an inch in order to hold lumber sizes within tolerances. This accuracy is increased by the degree of accuracy of anti-deviation control obtained with the force sensor guide pressure feedback of the invention, a technical advance in the art.

EXAMPLE

A sawmill testing the anti-deviation controller of the invention reported that target tolerances for lumber could be tightened by $\frac{1}{32}$ of an inch. For a twin that is $\frac{1}{32}$nd times average length of 16 feet and diameter of one foot and 6,000 logs per shift, which is an increase of 250 ft³ per day or 3000 board feet per day and 75600 board feet per year. At the current market price of $400 per thousand that is an increase of $302,400 per year in increased production.

INCORPORATION BY REFERENCE

All of the U.S. patents, U.S. Patent Publications, U.S. Patent Applications, foreign patents, foreign patent applications and non-patent publications referred to in this specification and related filings are incorporated herein by reference in their entirety.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

Moreover, although wood is a preferred workpiece, the system may be utilized for cutting a variety of objects other than logs. Thus, it may be utilized in the cutting of cants and dimensioned lumber, and the cutting of plastic or metal, for example. Although the system as described herein is associated with a bandmill, it also may be used with industrial circular saws, for example, by installing guideblocks with force sensors on a circular sawblade beneath a workpiece. These and other changes may be made without departing from the spirit and scope of this invention and the spirit and scope of any claims thereto.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

REFERENCE NUMBERS OF THE DRAWINGS

1 Industrial bandmill
2 Sawblade
2a Traditional tooth
2b Gullet
3 Drive wheel
4 Idler wheel
5 Bottom sawguide or "guideblock"
5a Bottom sawguide front face
5b Bottom sawguide second face
6 Top sawguide
6a Top sawguide front face
7 Reciprocating carriage
8 Idler wheel axle center
9 Drive wheel axle center
10 Workpiece
12 Load cell assembly
13 Guide holder (first embodiment)
14 Anti-deviation feedspeed controller circuit
15 Motion drive mechanism
20 Carbide tooth
30 Load cell assembly
32 Jack bolt
34 Guide housing welded frame
35 Baseplate
36 Pivot assembly
37 Pivot bearing axle center
38 Pivot axle ears
39 Load bar
40 Set screw
41 Cap
42 Load cell IC package
43a Interior dust gasket
43b Exterior dust gasket
50 Guide holder (2nd embodiment)
51 Sawguide
51a Sawguide front face
52 Guide housing frame member
52a Upper guide housing aspect of frame member
52b Lower guide housing aspect of frame member
52f Anterior face of guide housing frame member
52p Posterior face of guide housing frame member
52s Reinforcing sidewall of guide housing frame member
53 Baseplate
54 Strain concentration slot
54a Mouth of strain concentration slot
55 Load cell assembly with slot-straddling member
56 Stress relief hole
57 Jack bolt
57a Sawguide support jig bolt
58 Sawguide coverplate 59 Guide housing dustcover
100 Bottom mounting block of load cell assembly
101 Top mounting block of load cell assembly
102 Cylindrical piston or "slot-straddling member" of load cell assembly
103 Force sensor package
104 Set screw
104a Set screw access port
105 Force sensor cavity gasket
106 Piston receptacle
106a Raised lip defining piston receptacle
107 Force sensor cavity
107a Precision raised lip defining force sensor cavity
108 Drill bore for wire harness
109 Sensor wire harness conduit
120 Twin bandsaw
121 Twin sawblade (Lt)
122 Twin sawblade (Rt)
124 Chain or motion drive mechanism
125a Press roll assembly (Lt)
125b Press roll assembly (Rt)
126 Drive wheel (Lt)
127 Drive wheel (Rt)
128 Idler wheel (Lt)
129 Idler wheel (Rt)
130a Force sensor package (Lt)
130b Force sensor package (Rt)
132a Bottom sawguide (Lt)
132b Bottom sawguide (Rt)
134a Guide holder (Lt)
134b Guide holder (Rt)
136a Top sawguide (Lt)
136b Top sawguide (Rt)
150 Right guide force sensor output
151 Left guide force sensor output
152 Guide force calculation from combined sensor output
153 Feedspeed control output
154 Power (%)
155 Guide force setpoint/power limit setpoint
156 Peak in guide force output on Rt sawblade
160 Right guide force sensor output
161 Left guide force sensor output
162 Guide force calculation from combined sensor output
163 Feedspeed control output
164 Power (%)
165 Guide force setpoint/power limit setpoint
166 Anomalous log "SLIP" event (both sawblades are strained)
170 Guide holder (3d embodiment)
171 Sawguide or "guideblock"
171a Front face of sawguide
172 Guide holder frame
173 Baseplate
174 Strain concentration slot
174a Mouth of strain concentration slot
175 Load cell assembly
176 Strain relief hole
177 Outlet for wire harness
180 Detachable sawguide support bracket
181 Adjustment bolts
182 Dustcover over strain concentration slot
190 Anti-deviation control method flowchart
299 Optional offset subroutine or function
300 Master software architecture
301 3D log modeling subsystem or function
302 Gullet fill calculation subsystem or function
303 Power control subsystem or function
310 Anti-deviation control system or function
311 Feedback control loop
320 Motion controller for execution of workpiece feedspeed and motion
330 Guide force sensor
340 Combination of functional blocks or subsystems for log modeling, depth of cut, power and anti-deviation control
350 Individual log cut signature
360 Baseline performance of conventional system
361 Improved performance of system with guide force sensor control system

I claim:

1. A method for making a bandmill cut through a workpiece, said bandmill having a sawblade, the sawblade having a cutting edge, a trailing edge, and first and second side faces connecting the cutting and trailing edges, a top sawguide and a bottom sawguide, each sawguide having a FRONT face enabled to contact and pre-strain the sawguide against the first side face of the sawblade for making a cut through a workpiece, a motion controller and a motion drive mechanism for controlling workpiece feedspeed; wherein said method is characterized by:
 (a) providing an anti-deviation feedback loop controller to an operator of a bandmill, said anti-deviation feedback loop controller comprising:
  i) a force sensor operatively coupled to a second face of said bottom sawguide, wherein said force sensor is enabled to sense a dynamic sawblade deflecting force of a side of the sawblade against the FRONT face of the bottom sawguide in real time while sawing a workpiece, said sawblade deflecting force caused by saw feed velocity through a nonuniform workpiece and preceding a lateral deflection of said sawblade toward or away from said FRONT face of said bottom sawguide during a cut, said force sensor to generate an electrical signal of a magnitude and a direction of said sawblade deflecting force;
  ii) an anti-deviation control system configured to receive said electrical signal from said force sensor, and to determine a feedspeed adjustment output therefrom;
  iii) a motion drive mechanism enabled to receive said feedspeed adjustment output from said anti-deviation control system and drive a workpiece feedspeed in response thereto;
 (b) pre-stressing said sawguide by laterally displacing said bottom sawguide against said first side face of the sawblade;
 (c) configuring said anti-deviation control system to digitally zero said electrical signal between cuts, such that a positive value of said electrical signal during a cut is associated with a lateral deflecting force of said blade in a first direction and a negative value is associated with a lateral deflecting force of said blade in an opposite direction;
 (d) operating said force sensor in
  i) a zero set state wherein said force sensor is elastically pre-strained in compression by statically pre-stressing said sawguide against said blade and digitally zeroing said electrical signal; and,
  ii) an anti-deviation detection state wherein force sensor is elastically compressed or relaxed during a cut by any lateral deflecting force of said blade against or away from said sawguide and said electrical signal may range around zero from a positive value to a negative value, and, (e) while cutting a workpiece, monitoring said magnitude and direction of said sawblade deflecting force and operating said motion drive mechanism under control of said anti-deviation control system so as to forestall any lateral deflection of said first side face of the sawblade perpendicular to the first side face of the sawblade from a true cut line, thereby operating an anti-deviation feedback control loop.

2. The method of claim 1, wherein said step for pre-stressing a sawblade comprises applying a larger tensioning push on a center axle of an idler wheel and a center axle of a drive wheel of said bandmill, said idler wheel and drive wheel having said sawblade looped thereacross, and then applying a smaller lateral push on said top sawguide and said bottom sawguide against said blade so as to displace said blade paralleledly out of plumb with a tangent connecting the outside edges of said wheels, thereby generating an electrical signal from said force sensor when said blade is at rest.

3. The method of claim 1, comprising operating said anti-deviation feedback loop controller as a negative feedback control loop by reducing workpiece feedspeed to counter an overfeed condition or an overpower condition in real time.

4. The method of claim 3, further comprising operating said anti-deviation feedback loop controller as a positive feedback control loop by maximizing workpiece feedspeed while minimizing deviation from a true cut in real time.

5. The method of claim 4, wherein said electrical signal is modulated by resistance in a cut, and further wherein said negative feedback control loop is configured to limit power to a bandmill according to a power limit setpoint.

6. The method of claim 1, wherein said bottom sawguide is operatively coupled to said force sensor by a mechanical linkage, a hydraulic linkage, an electromagnetic linkage, or a combination thereof.

7. The method of claim 1, wherein said motion drive mechanism is a reciprocating carriage, an end-dogging carriage, a sharp chain, a motorized press roll assembly, or a combination thereof.

8. The method of claim 1, wherein said motion controller is configured to coordinately respond to said output from said anti-deviation control system in combination with an output from a power control function, from a depth of cut function, from a three-dimensional log modeling function, or from a combination thereof.

* * * * *